United States Patent
Zhang et al.

(10) Patent No.: US 11,374,698 B2
(45) Date of Patent: Jun. 28, 2022

(54) PHYSICAL LAYER (PHY) DATA UNIT FORMAT FOR HYBRID AUTOMATIC REPEAT REQUEST (HARQ)

(71) Applicant: Marvell Asia Pte, Ltd., Singapore (SG)

(72) Inventors: Yan Zhang, San Jose, CA (US); Liwen Chu, San Ramon, CA (US); Rui Cao, Sunnyvale, CA (US); Hongyuan Zhang, Fremont, CA (US)

(73) Assignee: Marvell Asia Pte Ltd, Singapore (SG)

( * ) Notice: Subject to any disclaimer, the term of this patent is extended or adjusted under 35 U.S.C. 154(b) by 4 days.

(21) Appl. No.: 16/894,720

(22) Filed: Jun. 5, 2020

(65) Prior Publication Data

US 2020/0389259 A1  Dec. 10, 2020

Related U.S. Application Data

(60) Provisional application No. 62/857,666, filed on Jun. 5, 2019.

(51) Int. Cl.
*H04L 1/18* (2006.01)
*H04L 1/00* (2006.01)
(Continued)

(52) U.S. Cl.
CPC .......... *H04L 1/1819* (2013.01); *H04L 1/0008* (2013.01); *H04L 1/0061* (2013.01);
(Continued)

(58) Field of Classification Search
CPC ... H04L 1/1887; H04L 1/1819; H04L 1/1816; H04L 1/1822; H04L 1/1825;
(Continued)

(56) References Cited

U.S. PATENT DOCUMENTS 6,718,497 B1  4/2004  Whitby-Strevens
7,054,296 B1  5/2006  Sorrells et al.
(Continued)

FOREIGN PATENT DOCUMENTS

WO  WO-2009/120460 A2  10/2009

OTHER PUBLICATIONS

International Search Report and Written Opinion in International Patent Application No. PCT/US2020/036502, dated Sep. 30, 2020 (18 pages).

(Continued)

*Primary Examiner* — Phong La

(57) ABSTRACT

A wireless communication device generates physical layer (PHY) protocol service data units (PSDUs), and, in response to determining that the PHY data unit is to be transmitted according to a HARQ process, generates HARQ coding units of a common length, each of the HARQ coding units including a respective set of one or more PSDUs, and individually encodes the HARQ coding units. The wireless communication device also generates a HARQ signal field to the included in a PHY preamble of the PHY data unit. The HARQ signal field includes i) a common information subfield to indicate one or more parameters that commonly apply to each of at least some of the one or more HARQ coding units and ii) a respective HARQ coding unit information subfield for each of the HARQ coding units to indicate one or more parameters that apply to only the corresponding HARQ coding unit.

20 Claims, 13 Drawing Sheets

(51) Int. Cl.
*H04W 80/02* (2009.01)
*H04W 84/12* (2009.01)

(52) U.S. Cl.
CPC ............ *H04L 1/1893* (2013.01); *H04W 80/02* (2013.01); *H04W 84/12* (2013.01)

(58) Field of Classification Search
CPC ... H04L 1/1829; H04L 1/1893; H04L 1/1896; H04L 1/189; H04L 1/0061; H04L 1/007; H04L 1/0078; H04L 1/0071; H04L 1/0043; H04W 80/02; H04W 80/04; H04W 80/06; H04W 80/08
USPC .......................................................... 370/329
See application file for complete search history.

(56) References Cited

U.S. PATENT DOCUMENTS

| | | | |
|---|---|---|---|
| 8,175,015 | B1 | 5/2012 | Chowdhuri et al. |
| 8,599,803 | B1 | 12/2013 | Zhang et al. |
| 9,319,174 | B2 | 4/2016 | Merlin et al. |
| 9,351,333 | B1 | 5/2016 | Zhang et al. |
| 9,369,240 | B2 | 6/2016 | Pirskanen et al. |
| 9,876,614 | B1* | 1/2018 | Sun ....................... H04L 1/1685 |
| 10,135,582 | B1 | 11/2018 | Sun et al. |
| 2005/0180315 | A1 | 8/2005 | Chitrapu et al. |
| 2006/0050742 | A1 | 3/2006 | Grandhi et al. |
| 2007/0186134 | A1 | 8/2007 | Singh et al. |
| 2007/0245205 | A1 | 10/2007 | Popovski et al. |
| 2008/0165670 | A1 | 7/2008 | Tao et al. |
| 2009/0031185 | A1 | 1/2009 | Xhafa et al. |
| 2009/0074088 | A1 | 3/2009 | Tao et al. |
| 2009/0219851 | A1 | 9/2009 | Abraham et al. |
| 2009/0219870 | A1 | 9/2009 | Wengerter et al. |
| 2009/0259915 | A1 | 10/2009 | Livshitz et al. |
| 2010/0054189 | A1 | 3/2010 | Chang et al. |
| 2011/0038332 | A1 | 2/2011 | Liu et al. |
| 2011/0134816 | A1 | 6/2011 | Liu et al. |
| 2011/0199971 | A1 | 8/2011 | Kim et al. |
| 2011/0305176 | A1 | 12/2011 | Wentink |
| 2012/0140753 | A1 | 6/2012 | Lee et al. |
| 2013/0229996 | A1 | 9/2013 | Wang et al. |
| 2013/0315139 | A1 | 11/2013 | Abraham et al. |
| 2014/0079016 | A1 | 3/2014 | Dai et al. |
| 2014/0126580 | A1 | 5/2014 | Sampath et al. |
| 2014/0185695 | A1 | 7/2014 | Kenney et al. |
| 2014/0293868 | A1 | 10/2014 | Levanen et al. |
| 2015/0049677 | A1 | 2/2015 | Lin et al. |
| 2015/0063233 | A1 | 3/2015 | Choi et al. |
| 2016/0380727 | A1 | 12/2016 | Ryu et al. |
| 2017/0230149 | A1 | 8/2017 | Wang et al. |
| 2018/0102929 | A1 | 4/2018 | Lin et al. |
| 2018/0302256 | A1 | 10/2018 | Huang et al. |
| 2019/0222680 | A1* | 7/2019 | Chu ..................... H04W 72/046 |
| 2020/0136753 | A1* | 4/2020 | Zhang ................... H04L 1/0063 |
| 2020/0136764 | A1* | 4/2020 | Zhang ................... H04L 1/0063 |
| 2020/0195376 | A1* | 6/2020 | Zhang ................... H04L 1/1819 |
| 2020/0280399 | A1* | 9/2020 | Kim ...................... H04L 1/1819 |
| 2020/0329519 | A1* | 10/2020 | Cao ....................... H04L 1/0003 |

OTHER PUBLICATIONS

Fang et al., "Efficient channel access scheme for multiuser parallel transmission under channel bonding in IEEE 802.11ac," The Institution of Engineering and Technology, IET Commun., vol. 9, Issue 13, pp. 1591-1597 (Apr. 12, 2015).

IEEE Draft 802.11ax D3.2, "Draft Standard for Information Technology—Telecommunications and information exchange between systems Local and metropolitan area networks—Specific rqeuirements Part 11: Wireless LAN Medium Access Control (MAC) and Physical Layer (PHY) Specifications—Amendment 1: Enhancements for High . . . " vol. 802.11ax drafts, No. D3.2, pp. 1-698 (Oct. 16, 2018).

IEEE P802.11axTM/D5.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 1: Enhancements for High Efficiency WLAN," IEEE Computer Society, 772 pages (Oct. 2019).

IEEE P802.15.4m/D3, May 2013 IEEE Standard for Local metropolitan area networks—"Part 15.4: Low Rate Wireless Personal Area Networks (LR-WPANs)", Amendment 6: TV White Space Between 54 MHz and 862 MHz Physical Layer, Excerpt, 2 pages (May 2013).

IEEE Std 802.11-REVmcTM/D8.0 (revision of IEEE Std. 802.11TM-2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, 3774 pages (Aug. 2016).

Kwon et al., "SIG Structure for UL PPDU," IEEE Draft, doc. IEEE 802.11-15/0574r0, vol. 802.11ax, 18 pages (May 11, 2015).

U.S. Appl. No. 16/912,643, Zhang et al., "Physical Layer (PHY) Data Unit Encoding for Hybrid Automatic Repeat Request (HARQ) Transmission," filed Jun. 25, 2020.

* cited by examiner

PHYSICAL LAYER (PHY) DATA UNIT FORMAT FOR HYBRID AUTOMATIC REPEAT REQUEST (HARQ)

CROSS REFERENCES TO RELATED APPLICATIONS

This application claims the benefit of U.S. Provisional Patent Application No. 62/857,666, entitled "Hybrid ARQ (HARQ) Transmission Enabler-Encoder and Preamble Design," filed on Jun. 5, 2019, which is incorporated herein by reference in its entirety.

FIELD OF TECHNOLOGY

The present disclosure relates generally to wireless communication systems, and more particularly to physical layer (PHY) data unit formats for hybrid automatic repeat request (HARQ) transmissions.

BACKGROUND

In a wireless local area network (WLAN), communication devices exchange control information in media access control (MAC) protocol data units (MPDUs), sometimes referred to as "frames". Typically, multiple MPDUs are aggregated together and transmitted within one physical layer (PHY) protocol data unit (PPDU). If a receiver is unable to decode an MPDU within the PPDU, a transmitter of the MPDU will retransmit the MPDU within another PPDU.

Hybrid automatic repeat request (HARQ) is a technique for improving throughput in communication systems. With HARQ, when a receiver is not able to decode a received communication frame, the receiver stores the transmission in a buffer. Then, a transmitter retransmits the communication frame and the receiver decodes the communication frame using both the original transmission stored in the buffer and the retransmission, e.g., using "soft combining."

One example of a HARQ technique is referred to as "chase combining." In chase combining, the transmitter retransmits the same identical communication frame one or more times, and the receiver "soft combines" the original transmission and the one or more retransmissions to decode the communication frame.

Another example of a HARQ technique is referred to as "incremental redundancy." In incremental redundancy, the original transmission omits some bits (e.g., "puncturing" is used) from an encoded frame, and each retransmission omits different bits and includes some bits that were not included in the previous transmissions. Thus, with each retransmission, the receiver incrementally receives additional information that was not previously transmitted. The receiver then "soft combines" the original transmission and the one or more retransmissions to decode the communication frame.

PPDU formats defined by current WLAN protocols make the use of HARQ impractical. For example, current WLAN protocols specify that when multiple MPDUs are aggregated together and transmitted within one PPDU, the multiple MPDUs are jointly encoded. Thus, even if only one MPDU in the PPDU was not correctly received, all of the MPDUs in the PPDU would need to be retransmitted to implement HARQ in this context. In contrast, not performing HARQ and simply re-encoding the one MPDU and retransmitting the one MPDU is significantly more efficient.

SUMMARY

In an embodiment, a method for generating a physical layer (PHY) data unit for transmission in a wireless local area network (WLAN) includes determining, at a communication device, that the PHY data unit is to be transmitted according to a hybrid automatic repeat request (HARQ) process, and generating, at the communication device, a PHY data portion of the PHY data unit. Generating the PHY data portion comprises generating one or more PHY protocol service data units (PSDUs), and in response to determining that the PHY data unit is to be transmitted according to the HARQ process, generating one or more HARQ coding units of a common length, each of the one or more HARQ coding units generated to include a respective set of one or more PSDUs among the one or more PSDUs, and individually encoding HARQ coding units among the one or more HARQ coding units. The method also includes generating, at the communication device, a PHY preamble of the PHY data unit, including generating a HARQ signal field with HARQ information regarding the PHY data unit, wherein generating the HARQ signal field includes i) generating a common information subfield to indicate one or more parameters that commonly apply to each of at least some of the one or more HARQ coding units and ii) generating a respective HARQ coding unit information subfield for each of the one or more HARQ coding units to indicate one or more parameters that apply to only the corresponding HARQ coding unit among the one or more HARQ coding units.

In another embodiment, a wireless communication device comprises a network interface device associated with a first communication device, wherein the network interface device is implemented on one or more integrated circuit (IC) devices, and wherein the one or more IC devices are configured to: determine that the PHY data unit is to be transmitted according to a hybrid automatic repeat request (HARQ) process; generate a PHY data portion of the PHY data unit, comprising: generating one or more PHY protocol service data units (PSDUs), and in response to determining that the PHY data unit is to be transmitted according to the HARQ process, generating one or more HARQ coding units of a common length, each of the one or more HARQ coding units generated to include a respective set of one or more PSDUs among the one or more PSDUs, and individually encoding HARQ coding units among the one or more HARQ coding units. The one or more IC devices are further configured to generate a PHY preamble of the PHY data unit, including generating a HARQ signal field with HARQ information regarding the PHY data unit, wherein generating the HARQ signal field includes i) generating a common information subfield to indicate one or more parameters that commonly apply to each of at least some of the one or more HARQ coding units and ii) generating a respective HARQ coding unit information subfield for each of the one or more HARQ coding units to indicate one or more parameters that apply to only the corresponding HARQ coding unit among the one or more HARQ coding units.

DETAILED DESCRIPTION

As discussed above, physical layer (PHY) protocol data unit (PPDU) formats defined by current wireless local area network (WLAN) protocols make the use of Hybrid automatic repeat request (HARQ) prohibitive. For instance, the current WLAN protocols mandate that multiple media access control (MAC) protocol data units (MPDUs) aggregated together (referred to as an aggregate MPDU (A-MPDU)) within one PPDU are all encoded as one entity. As a result, there is no mechanism to ensure that the coded bits corresponding to each MPDU in a first transmission and in subsequent retransmissions are identical unless the entire A-MPDU is retransmitted. But retransmitting the entire A-MPDU if only a small fraction of MPDUs are not correctly received wastes radio resource, which will offset the benefits of using HARQ in many cases.

In embodiments disclosed herein, efficient A-MPDU PHY preamble designs for PPDUs and/or other PPDU format changes facilitate using HARQ with WLAN communications. For instance, in some embodiments described below, when multiple MPDUs are to be aggregated as an A-MPDU within one PPDU and when HARQ is to be used, each MPDU is individually encoded. In another embodiment, a plurality of HARQ coding units is generated, each HARQ coding unit including a respective set of one or more MPDUs, and each of the plurality of HARQ coding units is individually encoded. Because each MPDU or coding unit is individually encoded, a receiver needs to know boundaries between the encoded MPDUs or coding units in order to decode the MPDUs correctly, according to embodiments described below. Therefore, in some embodiments described below, an additional signal field is included in a PHY preamble of the PPDU, where the additional signal field includes HARQ-related information regarding the PPDU, such as indications of boundaries between encoded MPDUs or coding units in the PPDU, according to an embodiment. A receiver uses information in the additional signal field to process the individual MPDUs within the PPDU as part of a HARQ process, according to an embodiment.

Figure 1:
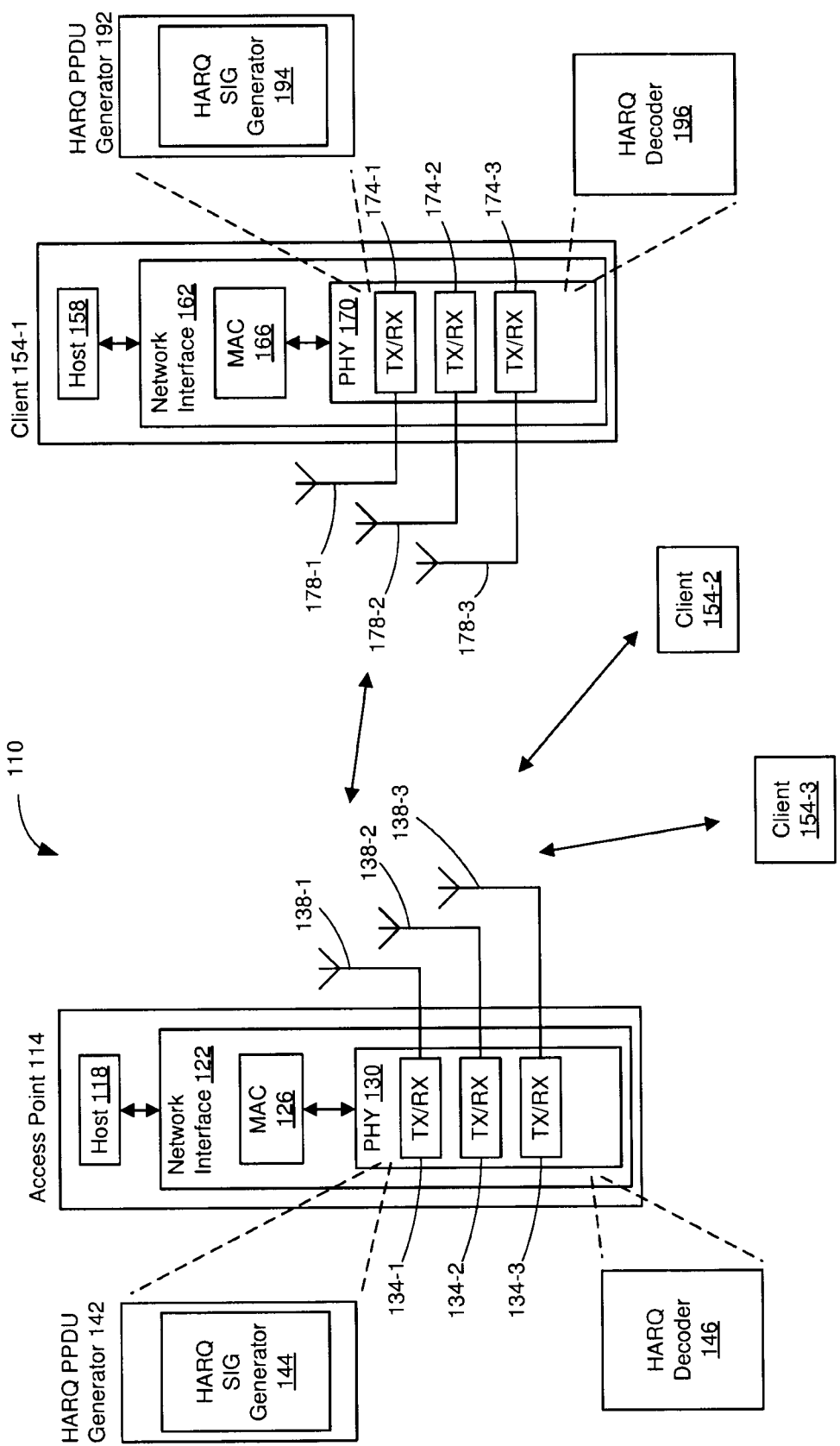
FIG. 1 is a block diagram of an example wireless local area network (WLAN) in which communication devices exchange physical layer (PHY) data units according to a hybrid automatic repeat request (HARQ) process, according to an embodiment.

FIG. 1 is a block diagram of an example WLAN 110, according to an embodiment. The WLAN 110 includes an access point (AP) 114 that is configured to transmit and receive PPDUs that are formatted for HARQ. The AP 114 comprises a host processor 118 coupled to a network interface device 122. The network interface 122 includes a media access control (MAC) layer processor 126 (referred to as a "MAC processor") and a PHY processor 130. The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

The network interface 122 is implemented using one or more integrated circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the network interface 122 may be implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 may be implemented, at least partially, on a first IC, and the network device 122 may be implemented, at least partially, on a second IC. As another example, the host processor 118 and at least a portion of the network interface 122 may be implemented on a single IC.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 is configured to implement MAC layer functions, including MAC layer functions of the WLAN communication protocol, and the PHY processor 130 is configured to implement PHY functions, including PHY functions of the WLAN communication protocol. For instance, the MAC processor 126 is configured to generate MAC layer data units such as MAC service data units (MSDUs), MPDUs, A-MPDUs, etc., and provide the MAC layer data units to the PHY processor 130.

In an embodiment, the MAC processor 126 includes a padding unit that is configured to determine a number of padding bits to be added to an MPDU, and to add the determined number of padding bits to the MPDU. In an embodiment, the padding unit comprises a logic circuit that is configured to determine the number of padding bits to be added to the MPDU, and/or to add the determined number of padding bits to the MPDU. In an embodiment, the padding unit is implemented at least partially by a processor of the MAC processor 126, wherein the processor executes machine readable instructions that, when executed by the processor, cause the processor to determine the number of padding bits to be added to the MPDU, and/or to add the determined number of padding bits to the MPDU, and/or control a logic circuit of the MAC processor 126 to add the determined number of padding bits to the MPDU.

The PHY processor 130 is configured to receive MAC layer data units from the MAC processor 126 and encapsulate the MAC layer data units to generate PHY data units such as PHY protocol data units (PPDUs), PHY protocol service data units (PSDUs), etc., for transmission via the antennas 138. Similarly, the PHY processor 130 is configured to receive PHY data units that were received via the antennas 138, and extract MAC layer data units encapsulated within the PHY data units. The PHY processor 130 may provide the extracted MAC layer data units to the MAC processor 126, which processes the MAC layer data units.

In an embodiment, the PHY processor 130 includes one or more forward error correction (FEC) encoders that are configured to encode bits in a MAC layer data unit according to one or more FEC coding schemes. For example, the PHY processor 130 includes a binary convolutional code (BCC) encoder, according to an embodiment. As another example, the PHY processor 130 additionally or alternatively includes a low density parity check (LDPC) encoder, according to another embodiment. In an embodiment, the FEC encoder comprises a logic circuit that is configured to encode bits in a MAC layer data unit according to an FEC coding scheme. In an embodiment, the FEC encoder is implemented at least partially by a processor of the PHY processor 130, wherein the processor executes machine readable instructions that, when executed by the processor, cause the processor to encode bits in a MAC layer data unit according to an FEC coding scheme.

Similarly, in an embodiment, the PHY processor 130 includes one or more FEC decoders that are configured to decode bits in a PHY data unit according to one or more FEC coding schemes. For example, the PHY processor 130 includes a BCC decoder, according to an embodiment. As another example, the PHY processor 130 additionally or alternatively includes an LDPC decoder, according to another embodiment. In an embodiment, the FEC decoder comprises a logic circuit that is configured to decode bits in a PHY data unit according to an FEC coding scheme. In an embodiment, the FEC decoder is implemented at least partially by a processor of the PHY processor 130, wherein the processor executes machine readable instructions that, when executed by the processor, cause the processor to decode bits in a PHY data unit according to an FEC coding scheme.

In an embodiment, the PHY processor 130 includes a padding unit that is configured to determine a number of padding bits to be added to a PHY data unit, and to add the determined number of padding bits to the PHY data unit. In an embodiment, some padding bits are added to the PHY data unit prior to the PHY processor 130 performing FEC encoding of the PHY data unit, and some padding bits are added to the PHY data unit after the PHY processor 130 performs FEC encoding of the PHY data unit. Accordingly, the padding unit is configured to determine a first number of padding bits to be added to a PHY data unit prior to performing FEC encoding of the PHY data unit, and to determine a second number of padding bits to be added to the PHY data unit after performing FEC encoding of the PHY data unit, in an embodiment.

In an embodiment, the padding unit comprises a logic circuit that is configured to determine the number of padding bits to be added to the PHY data unit, and/or to add the determined number of padding bits to the PHY data unit. In an embodiment, the padding unit is implemented at least partially by a processor of the PHY processor 130, wherein the processor executes machine readable instructions that, when executed by the processor, cause the processor to determine the number of padding bits to be added to the PHY data unit, and/or to add the determined number of padding bits to the PHY data unit, and/or control a logic circuit of the PHY processor 130 to add the determined number of padding bits to the PHY data unit.

In various embodiments, the MAC processor 126 is configured to generate and process MAC layer data units such as described herein. In various embodiments, the PHY processor 130 is configured to generate and process PHY data units such as described herein.

The PHY processor 130 is configured to downconvert one or more radio frequency (RF) signals received via the one or more antennas 138 to one or more baseband analog signals, and convert the analog baseband signal(s) to one or more digital baseband signals, according to an embodiment. The PHY processor 130 is further configured to process the one or more digital baseband signals to demodulate the one or more digital baseband signals and to generate a PPDU. The PHY processor 130 includes amplifiers (e.g., a low noise amplifier (LNA), a power amplifier, etc.), a radio frequency (RF) downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals by, for example, providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a read ROM, a flash memory, etc. In an embodiment, the MAC processor 126 includes a hardware state machine that is configured to perform MAC layer functions, control the PHY processor 130, etc.

In an embodiment, the PHY processor 130 includes a HARQ PPDU generator 142 that is configured to generate PPDUs that are formatted for HARQ transmissions (sometimes referred to herein as "HARQ PPDUs"), according to an embodiment. For example, the HARQ PPDU generator 142 is configured to generate HARQ PPDUs to include individually encoded MPDUs, or individually encoded common-length HARQ coding units each including one or multiple MPDUs, such as described herein. In an embodiment, the HARQ PPDU generator 142 includes a HARQ signal (SIG) field generator 144 that is configured to generate SIG fields in PHY preambles of HARQ PPDUs, wherein the SIG field includes HARQ-related information regarding the HARQ PPDUs, such as information needed to properly decode the individually encoded MPDUs, or the individually encoded HARQ coding units, included in a PPDU, according to an embodiment. Such SIG fields are sometimes referred to herein as "HARQ SIG fields." For example, the HARQ PPDU generator 144 is configured to generate HARQ SIG fields such as described herein.

In an embodiment, the HARQ PPDU generator 142 is implemented by a processor configured to execute machine readable instructions stored in a memory device (not shown) such as a RAM, a ROM, a flash memory, etc. In an embodiment, the HARQ PPDU generator 142 additionally or alternatively includes a hardware state machine that is configured to generate HARQ PPDUs such as described herein. Similarly, the HARQ SIG field generator 144 is implemented by a processor configured to execute machine readable instructions stored in a memory device (not shown) such as a RAM, a ROM, a flash memory, etc. In an embodiment, the HARQ SIG field generator 144 additionally or alternatively includes a hardware state machine that is configured to generate delimiter fields such as described herein.

In an embodiment, the PHY processor 130 also includes a HARQ decoder 146 that is configured to decode an MPDU by "soft combining" an original transmission of the MPDU and one or more retransmissions of the MPDU. The HARQ decoder 146 is configured to use HARQ-related information in a HARQ SIG field of a HARQ PPDU to identify within the HARQ PPDU a beginning of an individually encoded MPDU, or a beginning of an individually encoded HARQ coding unit that includes one or multiple MPDUS, and an end of the individually encoded MPDU or the individually encoded HARQ coding unit that includes one or multiple MPDUs, so that the received one or more MPDUs can be "soft combined" with another transmission of the one or more MPDUs, according to an embodiment.

In an embodiment, the HARQ decoder 146 is implemented by a processor configured to execute machine readable instructions stored in a memory device (not shown) such as a RAM, a ROM, a flash memory, etc. In an embodiment, the HARQ decoder 146 additionally or alternatively includes a hardware state machine that is configured to process HARQ SIG fields such as described herein and/or identify MPDUs within HARQ PPDUs such as described herein.

The WLAN 110 includes a plurality of client stations 154 that are configured to transmit and receive HARQ PPDUs. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a network interface device 162. The network interface 162 includes a MAC processor 166 and a PHY processor 170. The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

The network interface 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface 162 may be implemented using an SoC, where the SoC includes at least a portion of the MAC processor 166 and at least a portion of the PHY processor 170.

In an embodiment, the host processor 158 includes a processor configured to execute machine readable instructions stored in a memory device (not shown) such as a RAM, a ROM, a flash memory, etc. In an embodiment, the host processor 158 may be implemented, at least partially, on a first IC, and the network device 162 may be implemented, at least partially, on a second IC. As another example, the host processor 158 and at least a portion of the network interface 162 may be implemented on a single IC.

In various embodiments, the MAC processor 166 and the PHY processor 170 of the client device 154-1 are configured to generate data units, and process received data units, that conform to the WLAN communication protocol or another suitable communication protocol. For example, the MAC processor 166 is configured to implement MAC layer functions, including MAC layer functions of the WLAN communication protocol, and the PHY processor 170 is configured to implement PHY functions, including PHY functions of the WLAN communication protocol. The MAC processor 166 is configured to generate MAC layer data units such as MSDUs, MPDUs, A-MPDUs, etc., and provide the MAC layer data units to the PHY processor 170.

In an embodiment, the MAC processor 166 includes a padding unit that is configured to determine a number of padding bits to be added to an MPDU, and to add the determined number of padding bits to the MPDU. In an embodiment, the padding unit comprises a logic circuit that is configured to determine the number of padding bits to be added to the MPDU, and/or to add the determined number of padding bits to the MPDU. In an embodiment, the padding unit is implemented at least partially by a processor of the MAC processor 166, wherein the processor executes machine readable instructions that, when executed by the processor, cause the processor to determine the number of padding bits to be added to the MPDU, and/or to add the determined number of padding bits to the MPDU, and/or control a logic circuit of the MAC processor 166 to add the determined number of padding bits to the MPDU.

The PHY processor 170 is configured to receive MAC layer data units from the MAC processor 166 and encapsulate the MAC layer data units to generate PHY data units such as PPDUs, PSDUs, etc., for transmission via the antennas 178. Similarly, the PHY processor 170 is configured to receive PHY data units that were received via the antennas 178, and extract MAC layer data units encapsulated within the PHY data units. The PHY processor 170 may provide the extracted MAC layer data units to the MAC processor 166, which processes the MAC layer data units.

In an embodiment, the PHY processor 170 includes one or more FEC encoders that are configured to encode bits in a MAC layer data unit according to one or more FEC coding schemes. For example, the PHY processor 170 includes a BCC encoder, according to an embodiment. As another example, the PHY processor 170 additionally or alternatively includes an LDPC encoder, according to another embodiment. In an embodiment, the FEC encoder comprises a logic circuit that is configured to encode bits in a MAC layer data unit according to an FEC coding scheme. In an embodiment, the FEC encoder is implemented at least partially by a processor of the PHY processor 170, wherein the processor executes machine readable instructions that, when executed by the processor, cause the processor to encode bits in a MAC layer data unit according to an FEC coding scheme.

Similarly, in an embodiment, the PHY processor 170 includes one or more FEC decoders that are configured to decode bits in a PHY data unit according to one or more FEC coding schemes. For example, the PHY processor 170 includes a BCC decoder, according to an embodiment. As another example, the PHY processor 130 additionally or alternatively includes an LDPC decoder, according to another embodiment. In an embodiment, the FEC decoder comprises a logic circuit that is configured to decode bits in a PHY data unit according to an FEC coding scheme. In an embodiment, the FEC decoder is implemented at least partially by a processor of the PHY processor 170, wherein the processor executes machine readable instructions that, when executed by the processor, cause the processor to decode bits in a PHY data unit according to an FEC coding scheme.

In an embodiment, the PHY processor 170 includes a padding unit that is configured to determine a number of padding bits to be added to a PHY data unit, and to add the determined number of padding bits to the PHY data unit. In an embodiment, some padding bits are added to the PHY data unit prior to the PHY processor 170 performing FEC encoding of the PHY data unit, and some padding bits are added to the PHY data unit after the PHY processor 170 performs FEC encoding of the PHY data unit. Accordingly, the padding unit is configured to determine a first number of padding bits to be added to a PHY data unit prior to performing FEC encoding of the PHY data unit, and to determine a second number of padding bits to be added to the PHY data unit after performing FEC encoding of the PHY data unit, in an embodiment.

In an embodiment, the padding unit comprises a logic circuit that is configured to determine the number of padding bits to be added to the PHY data unit, and/or to add the determined number of padding bits to the PHY data unit. In an embodiment, the padding unit is implemented at least partially by a processor of the PHY processor 170, wherein the processor executes machine readable instructions that, when executed by the processor, cause the processor to determine the number of padding bits to be added to the PHY data unit, and/or to add the determined number of padding bits to the PHY data unit, and/or control a logic circuit of the PHY processor 170 to add the determined number of padding bits to the PHY data unit.

The PHY processor 170 is configured to downconvert one or more RF signals received via the one or more antennas 178 to one or more baseband analog signals, and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes amplifiers (e.g., an LNA, a power amplifier, etc.), an RF downconverter, an RF upconverter, a plurality of filters, one or more ADCs, one or more DACs, one or more DFT calculators (e.g., an FFT calculator), one or more IDFT calculators (e.g., an IFFT calculator), one or more modulators, one or more demodulators, etc.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals by, for example, providing one or more MAC layer data units (e.g., MPDUs) to the PHY processor 170, and optionally providing one or more control signals to the PHY processor 170, according to some embodiments. In an embodiment, the MAC processor 166 includes a processor configured to execute machine readable instructions stored in a memory device (not shown) such as a RAM, a ROM, a flash memory, etc. In an embodiment, the MAC processor 166 includes a hardware state machine that is configured to perform MAC layer functions, control the PHY processor 170, etc.

In an embodiment, the PHY processor 170 includes a HARQ PPDU generator 192 that is configured to generate HARQ PPDUs, according to an embodiment. For example, the HARQ PPDU generator 192 is configured to generate HARQ PPDUs such as described herein. In an embodiment, the HARQ PPDU generator 192 includes a HARQ SIG field generator 194 that is configured to generate HARQ SIG fields in PHY preambles of HARQ PPDUs, according to an embodiment. For example, the HARQ PPDU generator 194 is configured to generate HARQ SIG fields such as described herein.

In an embodiment, the HARQ PPDU generator 192 is implemented by a processor configured to execute machine readable instructions stored in a memory device (not shown) such as a RAM, a ROM, a flash memory, etc. In an embodiment, the HARQ PPDU generator 192 additionally or alternatively includes a hardware state machine that is configured to generate HARQ PPDUs such as described herein. Similarly, the HARQ SIG field generator 194 is implemented by a processor configured to execute machine readable instructions stored in a memory device (not shown) such as a RAM, a ROM, a flash memory, etc. In an embodiment, the HARQ SIG field generator 194 additionally or alternatively includes a hardware state machine that is configured to generate delimiter fields such as described herein.

In an embodiment, the PHY processor 170 also includes a HARQ decoder 196 that is configured to decode an MPDU by "soft combining" an original transmission of the MPDU and one or more retransmissions of the MPDU. The HARQ decoder 196 is configured to use HARQ-related information in a HARQ SIG field of a HARQ PPDU to identify within the HARQ PPDU a beginning of an individually encoded MPDU, or a beginning of an individually encoded HARQ coding unit that includes one or multiple MPDUS, and an end of the individually encoded MPDU or the individually encoded HARQ coding unit that includes one or multiple MPDUs, so that the received one or more MPDUs can be "soft combined" with another transmission of the one or more MPDUs, according to an embodiment.

In an embodiment, the HARQ decoder 196 is implemented by a processor configured to execute machine readable instructions stored in a memory device (not shown) such as a RAM, a ROM, a flash memory, etc. In an embodiment, the HARQ decoder 196 additionally or alternatively includes a hardware state machine that is configured to process HARQ SIG fields such as described herein and/or identify MPDUs within HARQ PPDUs such as described herein.

In an embodiment, each of the client stations 154-2 and 154-3 has a structure that is the same as or similar to the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

PPDUs are sometimes referred to herein as packets. MPDUs are sometimes referred to herein as frames.

Figure 2:
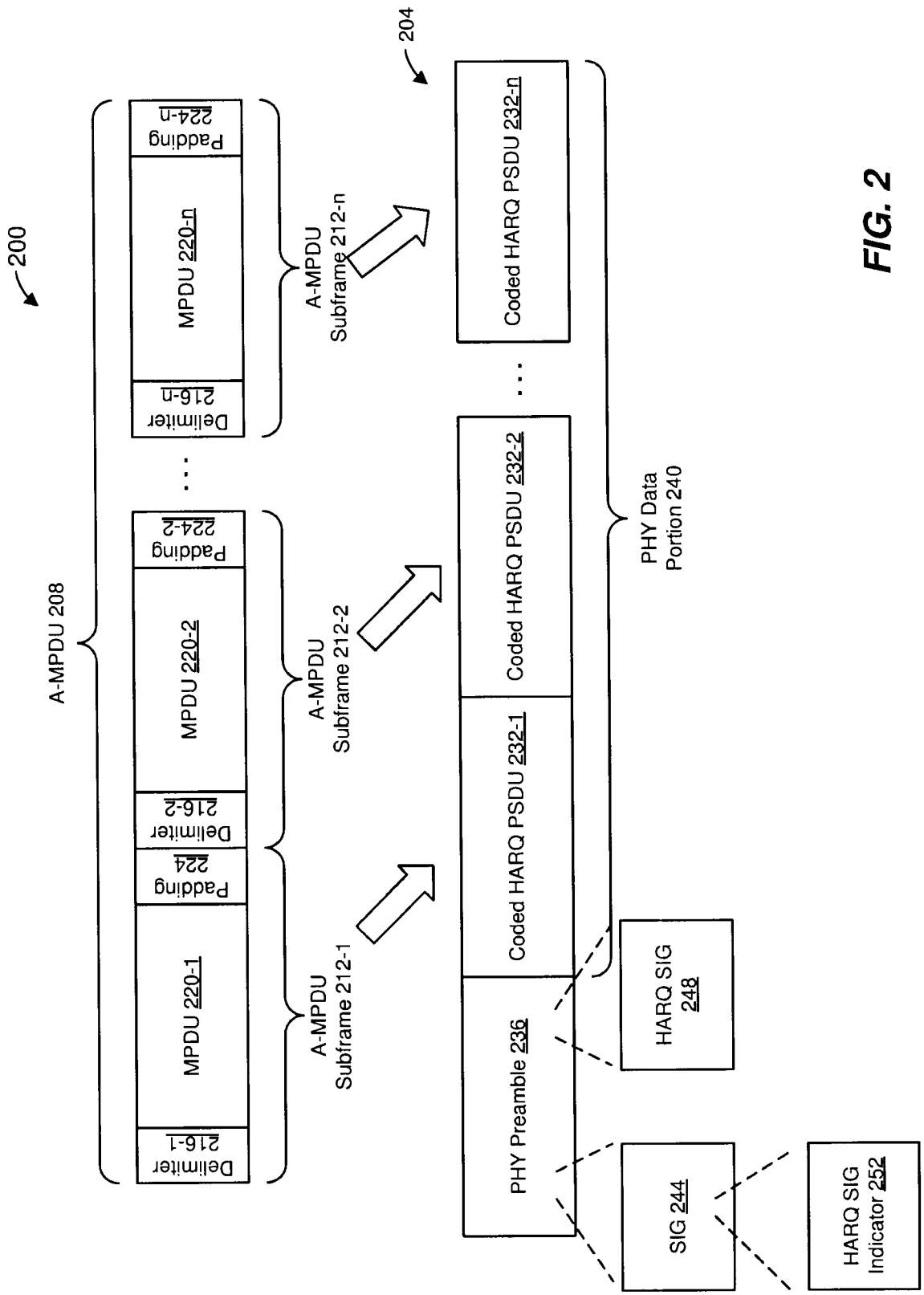
FIG. 2 is a diagram of an example process for generating a PHY data unit that includes i) a plurality of individually encoded HARQ PHY protocol service data units (PSDUs) in a PHY data portion, and ii) a PHY preamble with a HARQ signal field, according to an embodiment.

FIG. 2 is a diagram of an example process 200 for generating a PPDU that is formatted for a HARQ transmission (i.e., a "HARQ PPDU"), according to an embodiment. The network interface 122 is configured to perform the process 200, according to an embodiment. Similarly, the network interface 162 is configured to perform the process 200, according to an embodiment. In other embodiments, another suitable WLAN network interface performs the process 200.

The process 200 involves generating a HARQ PPDU 204 using an A-MPDU 208. In an embodiment, the network interface 122/162 is configured to generate the HARQ PPDU 204. In an embodiment, the PHY processor 130/170 is configured to generate the HARQ PPDU 204. In an embodiment, the HARQ PPDU generator 142/192 is configured to generate the HARQ PPDU 204.

In an embodiment, a MAC processor, such as the MAC processor 126 or the MAC processor 166, generates the A-MPDU 208. The A-MPDU 208 includes a plurality of A-MPDU subframes 212, where each A-MPDU subframe 212 corresponds to a PSDU. Each A-MPDU subframe 212 includes an MPDU delimiter 216, an MPDU 220, and optional padding bits 224. Each A-MPDU subframe 212 is individually encoded by an FEC encoder to generate a coded HARQ PSDU 232, in an embodiment. For example, an FEC encoder of a PHY processor, such as the PHY processor 130 or the PHY processor 170, individually encodes each A-MPDU subframe 212 to generate a coded HARQ PSDU 232, according to an embodiment. Individually encoding each A-MPDU subframe 212 facilitates a receiver to perform "soft combining" of an original transmission of the A-MPDU subframe 212 and one or more retransmissions of the A-MPDU subframe 212 as part of a HARQ scheme without having to retransmit the entire A-MPDU 208. In an embodiment, the FEC encoder is a BCC encoder. In another embodiment, the FEC encoder is an LDPC encoder.

The HARQ PPDU 204 is generated to include the HARQ PSDUs 232 and a PHY preamble 236. The PHY preamble 236 includes training signals (not shown) for performing one or more of packet detection, synchronization, automatic gain control (AGC) adjustment, channel estimation, etc. Additionally, the PHY preamble 236 includes a plurality of signal (SIG) fields that include indications of PHY parameters corresponding to a PHY data portion 240 of the PPDU 204 and which a receiver uses to demodulate and decode the PHY data portion 240. Examples of PHY parameters indicated by the plurality of SIG fields includes one or more of a modulation and coding scheme (MCS) applied to the PHY data portion 240 by a transmitter, a duration of the PHY data portion 240, a type of FEC encoding employed, etc.

The plurality of SIG fields includes a SIG field 244 that is included in PPDUs even when HARQ is not being used. Accordingly, the SIG field 244 includes indications of PHY parameters that are not related to HARQ transmission. The plurality of SIG fields also includes a SIG field 248 that includes indications of HARQ-related parameters (sometimes referred to herein as a "HARQ SIG field") and is only included in PPDUs for which HARQ is being used. Because the HARQ SIG field 248 is only included in PPDUs for which HARQ is being used, the SIG field 244 is configured to indicate whether the PPDU 204 includes the HARQ SIG field 248. For example, the SIG field 244 includes an indicator 252 that indicates whether the PPDU 204 includes the HARQ SIG field 248.

In some embodiments, the SIG field 244 is configured to indicate whether the PPDU 204 includes the HARQ SIG field 248. In other embodiments, the SIG field 244 is additionally configured to indicate one or more other parameters regarding the HARQ SIG field 248. For example, in various embodiments, the SIG field 244 is additionally configured to indicate one of, or any suitable combination of two or more of, i) a modulation scheme used to transmit the HARQ SIG field 248, ii) an FEC encoding scheme used to encode the HARQ SIG field 248, iii) an MCS used for the HARQ SIG field 248, iv) a length in bits of the HARQ SIG field 248, v) a duration of the HARQ SIG field 248 (e.g., indicated as a number of OFDM symbols), etc. In embodiments in which the SIG field 244 is additionally configured to indicate one or more other parameters (such as described above) regarding the HARQ SIG field 248, a receiver uses the indicated one or more other parameters in the SIG field 244 to properly process (e.g., one or more of demodulate, decode, etc.) the HARQ SIG field 248.

In some embodiments, PPDUs have different formats corresponding to different transmission modes or types. As an illustrative example, two or more PPDU formats correspond to two or more of the following example transmission modes: a single user (SU) mode, a multi-user (MU) mode, a trigger-based transmission mode, an extended range transmission mode, etc. Thus, in some embodiments, the PHY preamble 236 and/or the PHY data portion 240 have different formats depending on a particular transmission mode according to which the HARQ PPDU 204 is to be transmitted.

In some embodiments, the SIG field 244 is defined by a new wireless communication protocol. For example, the SIG field defined by the new wireless communication protocol includes one or more fields that are used to indicate whether the PPDU 204 includes the HARQ SIG field 248 and/or to indicate one or more other parameters related to the HARQ SIG field 248. As another example, when the SIG field 244 indicates that the PPDU 204 includes the HARQ SIG field 248, one or more bits and/or one or more subfields of the SIG field are repurposed to indicate one or more other parameters related to the HARQ SIG field 248. For example, when a PPDU is a non-HARQ PPDU, an MCS subfield in the SIG field 244 indicates an MCS used for the PHY data portion of the PPDU, whereas when the PPDU is a HARQ PPDU, the MCS subfield in the SIG field 244 indicates an MCS used for the HARQ SIG field 248, according to an embodiment. Similarly, one or more other subfields related to one or more other PHY parameters that are relevant for non-HARQ PPDUs but are not relevant for HARQ PPDUs are repurposed to provide one or more HARQ-related parameters such as i) a modulation scheme used to transmit the HARQ SIG field 248, ii) an FEC encoding scheme used to encode the HARQ SIG field 248, iii) a length in bits of the HARQ SIG field 248, iv) a duration of the HARQ SIG field 248 (e.g., indicated as a number of OFDM symbols), etc., in some embodiments. Similarly, one or more other subfields related to one or more other PHY parameters that are relevant for a PHY data portion of a HARQ PPDU are repurposed to provide one or more HARQ-related parameters such as i) a modulation scheme used to transmit the HARQ SIG field 248, ii) an FEC encoding scheme used to encode the HARQ SIG field 248, iii) a length in bits of the HARQ SIG field 248, iv) a duration of the HARQ SIG field 248 (e.g., indicated as a number of OFDM symbols), etc., and the PHY parameters that are relevant for the PHY data portion of a HARQ PPDU are indicated in the HARQ SIG field 248, according to some embodiments. Examples of subfields that are repurposed in various embodiments include one or more of i) a dual carrier modulation (DCM) field that indicates whether DCM is used for the PHY data portion, ii) a pre-FEC padding factor subfield that indicates a segment boundary in a last-occurring OFDM symbol of the PHY data portion, wherein padding bits are added prior to FEC encoding so that the FEC encoded bits end at the indicated segment boundary in the last-occurring OFDM symbol (in an embodiment, four segment boundaries are defined for an OFDM symbol, corresponding to four segments in the OFDM symbol; in other embodiments, another suitable quantity of segment boundaries are defined, such as 2, 3, 5, etc.), iii) a packet extension (PE) field disambiguity subfield which includes a parameter related to a PE field added to the PPDU (the parameter is used by a receiver to calculate a number of OFDM symbols in the PPDU), iv) an LDPC extra symbol segment subfield that indicates whether an extra OFDM symbol segment is present for pre-FEC padding when LDPC is used for encoding the PHY data portion, v) a space-time block code (STBC) subfield that is used to indicate whether STBC is used for the PHY data portion, etc.

In some embodiments, the SIG field 244 has a format based on a SIG field defined by a legacy wireless communication protocol. For example, the SIG field defined by the legacy wireless communication protocol may define one or more bits, and/or one or more fields that are designated as "reserved," and one or more of such reserved bits/fields are used to indicate whether the PPDU 204 includes the HARQ SIG field 248 and/or to indicate one or more other parameters related to the HARQ SIG field 248. As another example, when the SIG field 244 indicates that the PPDU 204 includes the HARQ SIG field 248, one or more bits and/or one or more subfields of the SIG field defined by the legacy wireless communication protocol are repurposed to indicate one or more other parameters related to the HARQ SIG field 248.

In an embodiment, the SIG field 244 has a format based on a SIG field defined by the current draft of the IEEE 802.11ax Standard. In another embodiment, the SIG field 244 has a format based on a SIG field format defined by another suitable standard (e.g., the IEEE 802.11be Standard, currently under development). In such embodiments, the SIG field 244 may have format that is the same as or is different from a SIG field defined by the current draft of the IEEE 802.11ax Standard. For exemplary purposes, Table 1 is a listing of subfields in the HE-SIG-A field for SU PPDUs and extended range (ER) SU PPDUs according to the current draft of the IEEE 802.11ax Standard. The SU PPDU format defined by the current draft of the IEEE 802.11ax Standard may be considered to correspond to a non-ER transmission mode, and thus the term "SU PPDU" may be considered to cover both the non-ER SU PPDU format and the ER SU PPDU format.

TABLE 1

| Bit | Subfield Name | # of bits | Description |
| --- | --- | --- | --- |
| B0 | Format | 1 | For differentiating an HE SU PPDU and an HE ER SU PPDU from an HE trigger-based (TB) PPDU: Set to 1 for an HE SU PPDU and HE ER SU PPDU |
| B2 | Beam Change | 1 | Set to 1 to indicate that pre-HE modulated fields of the PPDU are spatially mapped differently from a first symbol of an HE-LTF (long training field). Set to 0 to indicate that the pre-HE modulated fields of the PPDU are spatially mapped the same way as the first symbol of the HE-LTF on each tone. |
| B2 | UL/DL | 1 | Indicates whether the PPDU is sent in the uplink direction or in the downlink direction. |
| B3-B6 | MCS | 4 | For an HE SU PPDU: Set to n for MCSn, where n = 0, 1, 2, . . . , 11 Values 12-15 are reserved For HE ER SU PPDU with Bandwidth field set to 0 (242-tone resource unit): Set to n for MCSn, where n = 0, 1, 2 Values 3-15 are reserved For HE ER SU PPDU with Bandwidth field set to 1 (upper frequency 106-tone RU): Set to 0 for MCS 0 Values 1-15 are reserved |
| B7 | DCM | 1 | Indicates whether or not dual carrier modulation (DCM) is applied to the Data field for the MCS indicated. If the STBC field is 0, then set to 1 to indicate that DCM is applied to the Data field. Neither DCM nor |

TABLE 1-continued

| Bit | Subfield Name | # of bits | Description |
|---|---|---|---|
| | | | STBC shall be applied if both the DCM and STBC are set to 1. |
| | | | Set to 0 to indicate that DCM is not applied to the Data field. |
| B8-B13 | BSS Color | 6 | The BSS Color field is an identifier of the BSS. |
| B14 | Reserved | 1 | Reserved and set to 1 |
| B15-B18 | Spatial Reuse | 4 | Indicates whether or not spatial reuse is allowed during the transmission of this PPDU. |
| B19-B20 | Bandwidth | 2 | For an HE SU PPDU:<br>Set to 0 for 20 MHz<br>Set to 1 for 40 MHz<br>Set to 2 for 80 MHz<br>Set to 3 for 160 MHz and 80 + 80 MHz<br>For an HE ER SU PPDU:<br>Set to 0 for 242-tone RU<br>Set to 1 for upper frequency 106-tone RU within the primary 20 MHz<br>Values 2 and 3 are reserved |
| B21-B22 | GI + LTF Size | 2 | Indicates the GI duration and HE-LTF size.<br>Set to 0 to indicate a 1x HE-LTF and 0.8 μs GI<br>Set to 1 to indicate a 2x HE-LTF and 0.8 μs GI<br>Set to 2 to indicate a 2x HE-LTF and 1.6 μs GI<br>Set to 3 to indicate:<br>a 4x HE-LTF and 0.8 μs GI if both the DCM and STBC fields are 1. Neither DCM nor STBC shall be applied if both the DCM and STBC fields are set to 1.<br>a 4x HE-LTF and 3.2 μs GI, otherwise. |
| B23-B25 | NSTS and Midamble Periodicity | 3 | If the Doppler field is 0, indicates the number of spacetime streams.<br>Set to the number of space-time streams minus 1. For an HE ER SU PPDU, values 2 to 7 are reserved.<br>If the Doppler field is 1, then B23-B24 indicates the number of space time streams, up to 4, and B25 indicates the midamble periodicity.<br>B23-B24 is set to the number of space time streams minus 1.<br>For an HE ER SU PPDU, values 2 and 3 are reserved.<br>B25 is set to 0 for a midamble periodicity of 10 OFDM symbols, and set to 1 for a midamble periodicity of 20 OFDM symbols. |
| B26-B32 | TXOP | 7 | Indicates transmit opportunity period (TXOP) duration |
| B33 | Coding | 1 | Indicates whether BCC or LDPC is used |
| B34 | LDPC Extra Symbol Segment | 1 | Indicates whether an extra OFDM symbol segment is present for pre-FEC padding when LDPC is used. Reserved and set to 1 if BCC is used. |
| B35 | STBC | 1 | Indicates whether space-time block encoding (STBC) is used |
| B36 | Beamformed | 1 | Indicates whether beamforming is used |
| B37-B38 | Pre-FEC padding factor | 2 | Padding bits are added prior to FEC encoding so that the FEC encoded bits end at a boundary in an OFDM symbol. The Pre-FEC padding factor indicates the boundary. |
| B39 | PE Disambiguity | 1 | A parameter related to a packet extension field added to the PPDU. The parameter is used by a receiver to calculate a number of OFDM symbols in the PPDU. |
| B40 | Reserved | 1 | Reserved and set to 1. |
| B41 | Doppler | 1 | Indicates whether one or more midambles are present in the PPDU and/or whether midambles should be used in a reverse link. |
| B42-B45 | CRC | 4 | Cyclic redundancy check (CRC) bits for bits 0-41 of the HE-SIG-A field. |
| B46-B51 | Tail | 6 | Used to terminate a trellis of a convolutional decoder used to encode the HE-SIG-A field. |

In various embodiments, one or more of the bits designated as "reserved" in Table 1 are used to indicate whether the PPDU 204 includes the HARQ SIG field 248, and optionally to indicate one or more other parameters regarding the HARQ SIG field 248.

The current draft of the IEEE 802.11ax Standard defines the values 12-15 for the 4-bit MCS subfield as reserved. Thus, in an embodiment, the MCS subfield is set to any value in the range 12-15 to indicate that the PPDU 204 includes the HARQ SIG field 248, whereas when the MCS subfield is set to any value in the range 0-11, the PPDU 204 does not include the HARQ SIG field 248.

In an embodiment in which the HARQ SIG field 248 can be modulated/encoded according to different MCSs, the MCS subfield is set to a value that indicates the MCS according to which the HARQ SIG field 248 is modulated/encoded. As an illustrative example, the MCS subfield is set to any value in the range 12-15 to indicate that the PPDU 204 includes the HARQ SIG field 248 and the MCS according to which the HARQ SIG field 248 is modulated/encoded is the value in the MCS subfield minus 12, according to an embodiment. In such embodiments, the MCS according to which the PHY data portion is modulated/encoded is indicated in the HARQ SIG field 248, as is discussed below.

In an embodiment in which DCM can optionally be used for the HARQ SIG field 248, the DCM subfield is set to a value that indicates whether DCM is used for the HARQ SIG field 248. In such embodiments, whether DCM is used for the PHY data portion is modulated/encoded is indicated in the HARQ SIG field 248, as is discussed below.

In an embodiment in which different types of HARQ can be used (e.g., chase combining (CC), incremental redundancy (IR), etc.), one or more bits of the SIG field 244 are used to indicate the type of HARQ used for the PPDU 204. In an illustrative embodiment, when the SIG field 244 indicates that the HARQ SIG field 248 is included in the PPDU 204, the LDPC Extra Symbol Segment subfield is repurposed to indicate the type of HARQ used for the PPDU 204.

In an embodiment in which a length or duration of the HARQ SIG field 248 is variable, one or more bits of the SIG field 244 are used to indicate the length/duration of the HARQ SIG field 248. In an illustrative embodiment, when the SIG field 244 indicates that the HARQ SIG field 248 is included in the PPDU 204, bits 37-40 (e.g., the Pre-FEC Padding Factor, the PE Disambiguity, and the Reserved subfields) are repurposed to indicate a number of OFDM symbols of the HARQ SIG field 248. In such embodiments, Pre-FEC Padding Factor and PE Disambiguity information is included in the HARQ SIG field 248, as is discussed below.

In some embodiments, bit B14 (Reserved) is set to zero to indicate that the HARQ SIG field 248 is included in the PPDU 204. In some embodiments in which bit B14 (Reserved) is set to zero to indicate that the HARQ SIG field 248 is included in the PPDU 204 and a length or duration of the HARQ SIG field 248 is variable, one or more bits of the SIG field 244 are used to indicate the length/duration of the HARQ SIG field 248. In an illustrative embodiment, when bit B14 (Reserved) is set to zero, bits 37-40 (e.g., the Pre-FEC Padding Factor, the PE Disambiguity, and the Reserved subfields) are repurposed to indicate a number of OFDM symbols of the HARQ SIG field 248. In such embodiments, Pre-FEC Padding Factor and PE Disambiguity information is included in the HARQ SIG field 248, as is discussed below. In some embodiments in which bit B14 (Reserved) is set to zero to indicate that the HARQ SIG field 248 is included in the PPDU 204, the MCS used for the HARQ SIG field 248 is fixed, and the MCS subfield indicates the MCS used for the PHY data portion of the PPDU 204. In some embodiments in which bit B14 (Reserved) is set to zero to indicate that the HARQ SIG field 248 is included in the PPDU 204, DCM is never used for the HARQ SIG field 248, and the DCM subfield indicates whether DCM is used for the PHY data portion of the PPDU 204. In some embodiments in which bit B14 (Reserved) is set to zero to indicate that the HARQ SIG field 248 is included in the PPDU 204, DCM is always used for the HARQ SIG field 248, and the DCM subfield indicates whether DCM is used for the PHY data portion of the PPDU 204.

Figure 3A:
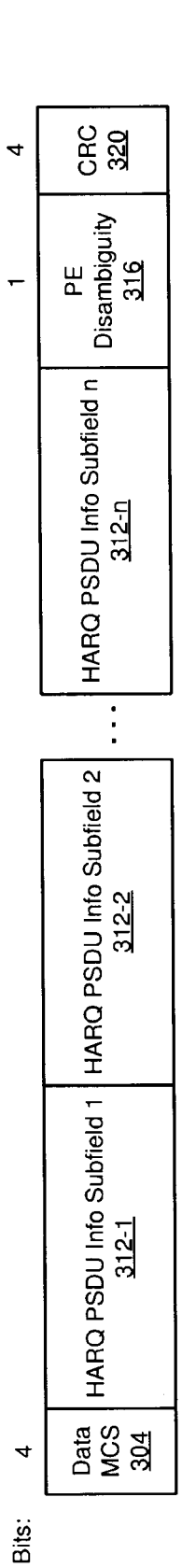
FIG. 3A is a diagram of an example HARQ signal field included in the PHY data unit of FIG. 2, according to an embodiment.

FIG. 3A is a diagram of an example HARQ SIG field 300 that is included in a PHY preamble of a HARQ PPDU, according to an embodiment. For example, the HARQ SIG field 300 is used as the HARQ SIG field 248 of FIG. 2, according to an embodiment.

In an embodiment, the network interface 122/162 is configured to generate the HARQ SIG field 300. In an embodiment, the PHY processor 130/170 is configured to generate the HARQ SIG field 300. In an embodiment, the HARQ PPDU generator 142/192 is configured to generate the HARQ SIG field 300. In an embodiment, the HARQ SIG field generator 144/194 is configured to generate the HARQ SIG field 300.

In embodiments in which an MCS subfield in the SIG field 244 is repurposed to indicate an MCS used for the HARQ SIG field 300 and/or to indicate that the HARQ PPDU includes the HARQ SIG field 300, the HARQ SIG field 300 includes an MCS subfield 304 that indicates an MCS used for the PHY data portion of the HARQ PPDU. In embodiments in which the MCS subfield in the SIG field 244 is not so repurposed, the HARQ SIG field 300 does not include the MCS subfield 304. The MCS subfield 304 includes a suitable number of bits for specifying an MCS from a suitable set of different MCSs. For example, when the MCS subfield 304 consists of four bits, the set of different MCSs can include up to sixteen different MCSs. As another example, when the MCS subfield 304 consists of three bits, the set of different MCSs can include up to eight different MCSs. Other suitable numbers of bits are used in other embodiments.

The HARQ SIG field 300 includes a respective HARQ PSDU information subfield 312 for each HARQ PSDU included in the HARQ PPDU, according to an embodiment. For instance, in embodiments in which the HARQ SIG field 300 is included in the PPDU 204 of FIG. 2, the HARQ SIG field 300 includes a respective HARQ PSDU information subfield 312 for each coded HARQ PSDU 232. Each HARQ PSDU information subfield 312 includes information for the corresponding HARQ PSDU. In an embodiment, an ordering of the HARQ PSDU information subfields 312 corresponds to an ordering of the HARQ PSDUs in the HARQ PPDU. For example, a first occurring HARQ PSDU information subfield 312 corresponds to a first occurring HARQ PSDU, a second occurring HARQ PSDU information subfield 312 corresponds to a second occurring HARQ PSDU, and so on.

In some embodiments in which a PE field may be added to a PPDU, the HARQ SIG field 300 also includes a PE disambiguity subfield 316. The PE disambiguity subfield 316 includes a parameter related to a PE field added to the PPDU (the parameter is used by a receiver to calculate a number of OFDM symbols in the PPDU).

In some embodiments, the HARQ SIG field 300 also includes an error detection (e.g., a cyclic redundancy check (CRC)) subfield 320. A value of the CRC subfield 320 is generated by applying an error detection code (e.g., a CRC code) to information from the other subfields of the HARQ SIG field 300.

Figure 3B:
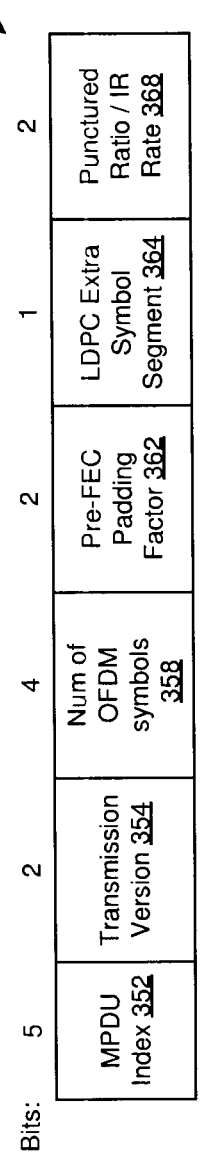
FIG. 3B is a diagram of an example HARQ PSDU information subfield included in the HARQ signal field of FIG. 3A, according to an embodiment.

FIG. 3B is a diagram of an example HARQ PSDU information subfield 350 that is included in HARQ SIG field 300, according to an embodiment. For example, the HARQ PSDU information subfield 350 is used as the HARQ PSDU information subfield 312 of FIG. 3A, according to an embodiment.

The HARQ PSDU information subfield 350 includes an MPDU index subfield 352 and a transmission version subfield 354. In an embodiment, the MPDU index subfield 352 uniquely identifies an MPDU, and the transmission version subfield 354 indicates whether the uniquely identified MPDU is an initial transmission (also referred herein as "new MPDU"), a first retransmission of the particular MPDU, a second retransmission of the particular MPDU, etc. For example, the transmission version subfield 354 is set to a value of zero to indicate an initial transmission of the MPDU, and is set to a number greater to zero to indicate the corresponding number of the retransmission of the MPDU, in an embodiment. The MPDU index subfield 352 for a particular MPDU remains the same in every (re)transmission of the MPDU, in an embodiment.

The HARQ PSDU information subfield 350 includes a number of OFDM symbols subfield 358 that indicates a number of OFDM symbols in the corresponding HARQ PSDU (e.g., the corresponding coded HARQ PSDU 232), according to an embodiment. The duration subfield 358 consists of a suitable number, N, of bits, such as six bits or another suitable number of bits. The total number of OFDM symbols in a HARQ PSDU will depend on an error correcting encoding rate that is used, a modulation scheme that is used, and a frequency bandwidth that is used. The MAC processor 126/166 is configured to ensure that an appropriate MAC layer data unit length is used for the error correcting encoding rate, the modulation scheme, and the frequency bandwidth so that the number of OFDM symbols in the HARQ PSDU can be represented by N bits. In another embodiment the number of OFDM symbols subfield 358 is replaced with a time duration field that indicates a time duration value for the corresponding HARQ PSDU (e.g., the corresponding coded HARQ PSDU 232).The HARQ PSDU information subfield 350 also includes a pre-FEC padding factor subfield 362 that indicates a segment boundary in a last-occurring OFDM symbol of the corresponding HARQ PSDU (e.g., the corresponding coded HARQ PSDU 232), wherein padding bits are added prior to FEC encoding so that the FEC encoded bits end at the indicated segment boundary in the last-occurring OFDM symbol of the corresponding HARQ PSDU (e.g., the corresponding coded HARQ PSDU 232). In other embodiments, the pre-FEC padding factor subfield 362 is omitted from the HARQ PSDU information subfield 350.

The HARQ PSDU information subfield 350 also includes an LDPC extra symbol segment subfield 364 that indicates whether an extra OFDM symbol segment is present in the last-occurring OFDM symbol of the corresponding HARQ PSDU (e.g., the corresponding coded HARQ PSDU 232) for pre-FEC padding when LDPC is used. In other embodiments, the LDPC extra symbol segment subfield 362 is omitted from the HARQ PSDU information subfield 350.

The HARQ PSDU information subfield 350 also includes a punctured ratio/IR rate subfield 368, in an embodiment. The punctured ratio/IR rate subfield 368 indicates a puncturing ratio (if comb combining is utilized) or IR rate (if incremental redundancy is utilized) that indicates data that is retransmitted in the corresponding HARQ PSDU, in an embodiment. In an embodiment, if comb combining is utilized, a value of 0 of the punctured ratio/IR rate subfield 368 indicates that all coded bits are retransmitted, a value of 1 of the punctured ratio/IR rate subfield 368 indicates that ½ of the coded bits are retransmitted, a value of 2 of the punctured ratio/IR rate subfield 368 indicates that ⅓ of the coded bits are retransmitted, and a value of 3 of the punctured ratio/IR rate subfield 368 indicates that ¼ of the coded bits are retransmitted. In an embodiment, if incremental redundancy is utilized, a value of 0 of the punctured ratio/IR rate subfield 368 indicates that the bits that are retransmitted are encoded at ¾ rate of the initial coding rate, a value of 1 of the punctured ratio/IR rate subfield 368 indicates that the bits that are retransmitted are encoded at ⅔ rate of the initial coding rate, a value of 2 of the punctured ratio/IR rate subfield 368 indicates that the bits that are retransmitted are encoded at ½ rate of the initial coding rate, and a value of 3 of the punctured ratio/IR rate subfield 368 indicates that that the bits that are retransmitted are encoded at ⅓ rate of the initial coding rate. In an embodiment, the punctured ratio/IR rate subfield 368 is included in the HARQ PSDU information subfield 350 if the HARQ PSDU information subfield 350 corresponds to a retransmission HARQ PDSU (e.g., as indicated by a value of greater than zero of the transmission version subfield 354), and is excluded from the HARQ PSDU information subfield 350 if the HARQ PSDU information subfield 350 corresponds to an initial HARQ PDSU (e.g., as indicated by a value of zero of the transmission version subfield 354).

The number above a subfield of the HARQ SIG field 300 indicated in FIGS. 3A-3B indicates a number of bits included in the corresponding subfield according to an example embodiment. In other embodiments, the subfields of the HARQ SIG field 300 include other suitable numbers of bits.

Figure 4:
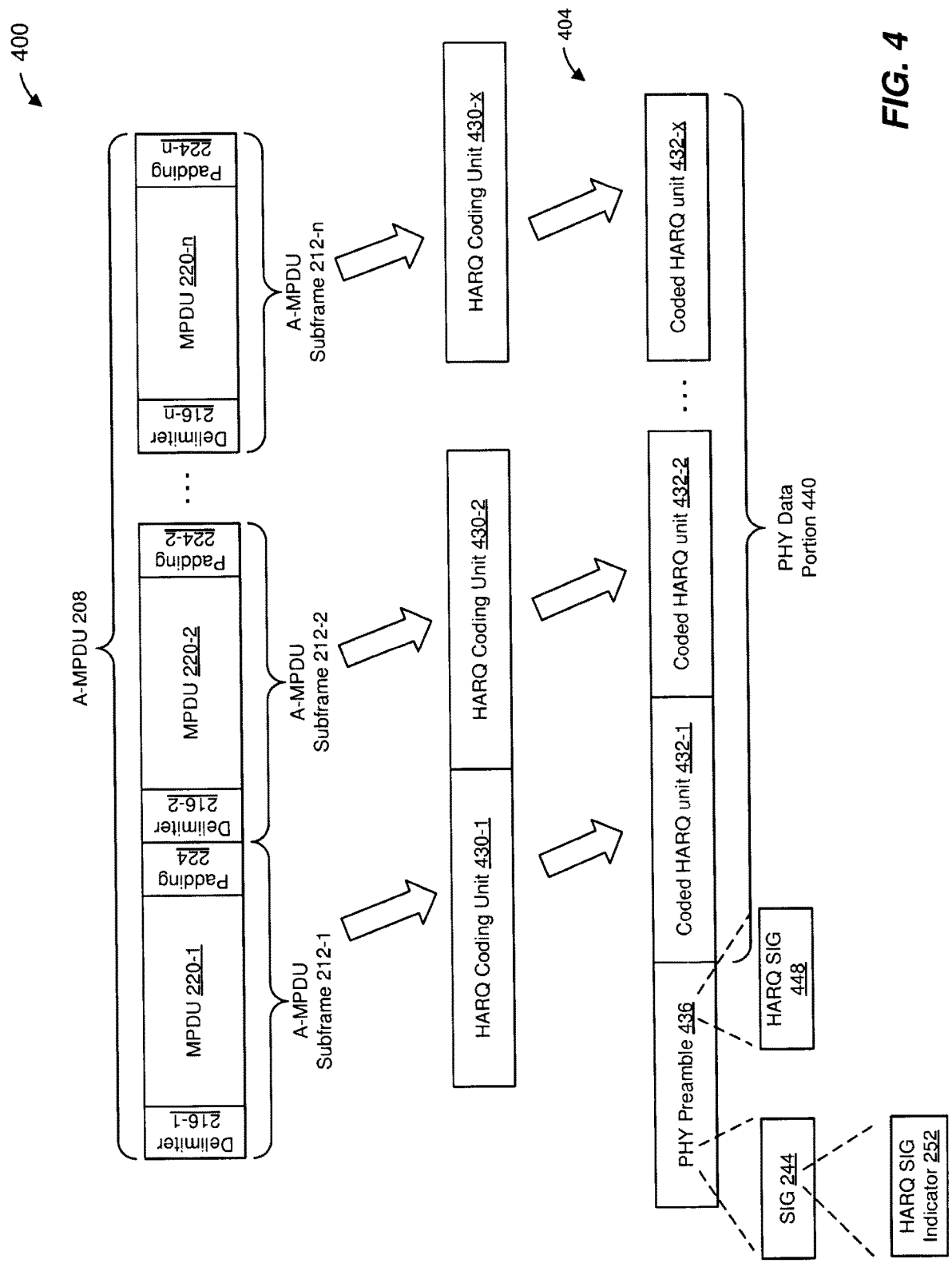
FIG. 4 is a diagram of an example process for generating a PHY data unit that includes i) a plurality of individually encoded HARQ coding units having a common length in a PHY data portion, and ii) a PHY preamble with a HARQ signal field, according to an embodiment.

FIG. 4 is a diagram of an example process 400 for generating a HARQ PPDU, according to another embodiment. The network interface 122 is configured to perform the process 300, according to an embodiment. Similarly, the network interface 162 is configured to perform the process 400, according to an embodiment. In other embodiments, another suitable WLAN network interface performs the process 400.

The process 400 is similar to the process 200 of FIG. 2, and like-numbered elements are not described in detail for brevity. In an embodiment, the network interface 122/162 is configured to generate the HARQ PPDU 404. In an embodiment, the PHY processor 130/170 is configured to generate the HARQ PPDU 404. In an embodiment, the HARQ PPDU generator 142/192 is configured to generate the HARQ PPDU 404.

Unlike the process 200 of FIG. 2, in which each A-MPDU subframe 212 is individually encoded to generate a coded HARQ PSDU 232, the process 400 includes generating one or more HARQ coding units 430 and individually encoding each HARQ coding units 430 to generate a corresponding coded HARQ unit 432, in an embodiment. For example, an FEC encoder of a PHY processor, such as the PHY processor 130 or the PHY processor 170, individually encodes each HARQ coding units 430 to generate a coded HARQ unit 432, according to an embodiment. Each HARQ coding unit 430 is generated to include one or more subframes 212, in an embodiment. Each of at least some of the HARQ coding units 430 additionally includes a respective number of padding bits, in an embodiment. The number of padding bits to be included in a particular HARQ coding unit 430 is determined to ensure that the HARQ coding units 430 have a common length, in an embodiment. Individually encoding each HARQ coding unit 430 facilitates a receiver to perform "soft combining" of an original transmission of the one or more A-MPDU subframes 212 included in and HARQ coding unit 430 and one or more retransmissions of the one or more A-MPDU subframes 212 as part of a HARQ scheme without having to retransmit the entire A-MPDU 208. In an embodiment, the FEC encoder is a BCC encoder. In another embodiment, the FEC encoder is an LDPC encoder.

The HARQ PPDU 404 is generated to include HARQ coding units 430 and a PHY preamble 436. The preamble 436 is generally similar to the preamble 226 of the HARQ PPDU 204 of FIG. 2. Like the preamble 226, the PHY preamble 436 includes a plurality of signal (SIG) fields that include indications of PHY parameters corresponding to a PHY data portion 440 of the PPDU 404 and which a receiver uses to demodulate and decode the PHY data portion 440. The plurality of SIG fields includes the SIG field 244 and a SIG field 448 that includes indications of HARQ-related parameters (sometimes referred to herein as a "HARQ SIG field") and is only included in PPDUs for which HARQ is being used. Because the HARQ SIG field 448 is only included in PPDUs for which HARQ is being used, the SIG field 244 is configured to indicate whether the PPDU 204 includes the HARQ SIG field 448. For example, the SIG field 244 includes the indicator 252 that indicates whether the PPDU 404 includes the HARQ SIG field 448.

Figure 5A:
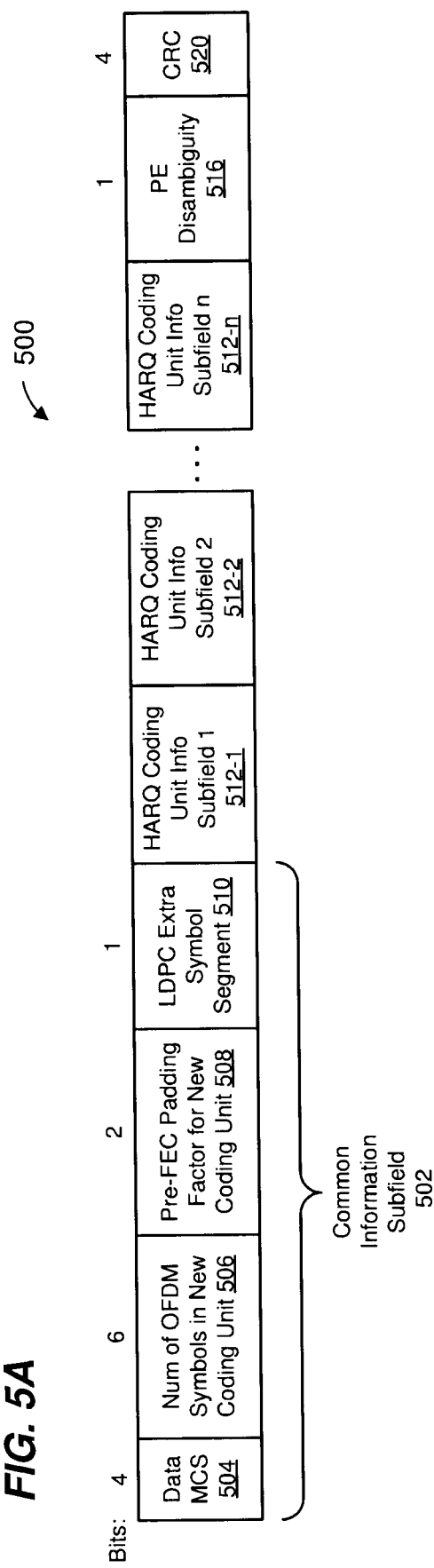
FIG. 5A is a diagram of an example HARQ signal field included in the PHY data unit of FIG. 4, according to an embodiment.

FIG. 5A is a diagram of an example HARQ SIG field 500 that is included in a PHY preamble of a HARQ PPDU, according to an embodiment. For example, the HARQ SIG field 500 is used as the HARQ SIG field 448 of FIG. 4, according to an embodiment.

In an embodiment, the network interface 122/162 is configured to generate the HARQ SIG field 500. In an embodiment, the PHY processor 130/170 is configured to generate the HARQ SIG field 500. In an embodiment, the HARQ PPDU generator 142/192 is configured to generate the HARQ SIG field 500. In an embodiment, the HARQ SIG field generator 144/194 is configured to generate the HARQ SIG field 500.

In an embodiment, the HARQ SIG field 500 includes a common information subfield that indicates one or more parameters that commonly apply to each of at least some of one or more HARQ coding units, and a respective HARQ coding unit information subfield 512 to indicate one or more parameters that apply to only the corresponding HARQ coding unit among the one or more HARQ coding units.

In embodiments in which an MCS subfield in the SIG field 244 is repurposed to indicate an MCS used for the HARQ SIG field 500 and/or to indicate that the HARQ PPDU includes the HARQ SIG field 500, the HARQ SIG field 500 includes, in the common information subfield 502, an MCS subfield 504 that indicates an MCS used for the PHY data portion of the HARQ PPDU. In embodiments in which the MCS subfield in the SIG field 244 is not so repurposed, the HARQ SIG field 500 does not include the MCS subfield 504. The MCS subfield 504 includes a suitable number of bits for specifying an MCS from a suitable set of different MCSs. For example, when the MCS subfield 504 consists of four bits, the set of different MCSs can include up to sixteen different MCSs. As another example, when the MCS subfield 504 consists of three bits, the set of different MCSs can include up to eight different MCSs. Other suitable numbers of bits are used in other embodiments.

The common information subfield 502 includes a number of OFDM symbols in new coding unit subfield 506 that indicates a number of OFDM symbols in each HARQ coding unit that corresponds to an initial HARQ transmission (i.e., also referred to herein as "new HARQ coding unit" or simply "new coding unit"), in an embodiment. In an embodiment, if the HARQ PPDU does not include any new coding units (e.g., of all coding units included in the HARQ PPDU correspond to retransmission coding units), the number of OFDM symbols in new coding unit subfield 506 is set to a value of zero. The common information subfield 502 also includes a pre-FEC padding factor subfield 508 that indicates a segment boundary in a last-occurring OFDM symbol of each HARQ coding unit that corresponds to an initial HARQ transmission, wherein padding bits are added prior to FEC encoding so that the FEC encoded bits end at the indicated segment boundary in the last-occurring OFDM symbol of the corresponding HARQ coding unit. In an embodiment, the pre-FEC padding factor subfield 508 is omitted from the common information subfield 502 if the number of OFDM symbols in new coding unit subfield 506 is set to a value of zero indicating that the HARQ PPDU does not include any new coding units.

The common information subfield 502 also includes an LDPC extra symbol segment subfield 510 that indicates whether an extra OFDM symbol segment is present in the last-occurring OFDM symbol of each HARQ coding unit that corresponds to an initial HARQ transmission for pre-FEC padding when LDPC is used. In an embodiment, the LDPC extra symbol segment subfield 510 is omitted from the common information subfield 502 if the number of OFDM symbols in new coding unit subfield 506 is set to a value of zero indicating that the HARQ PPDU does not include any new coding units.

The HARQ SIG field 500 includes a respective HARQ coding unit information subfield 512 for each HARQ coding unit included in the HARQ PPDU, according to an embodiment. For instance, in embodiments in which the HARQ SIG field 500 is included in the PPDU 404 of FIG. 4, the HARQ SIG field 500 includes a respective HARQ coding unit information subfield 512 for each coded HARQ coding unit 432. Each HARQ coding unit information subfield 512 includes information for the corresponding HARQ coding unit. In an embodiment, an ordering of the HARQ coding unit information subfields 512 corresponds to an ordering of the HARQ coding units in the HARQ PPDU. For example, a first occurring HARQ coding unit information subfield 512 corresponds to a first occurring HARQ coding unit, a second occurring HARQ coding unit information subfield 512 corresponds to a second occurring HARQ coding unit, and so on.

In some embodiments in which a PE field may be added to a PPDU, the HARQ SIG field 500 also includes a PE disambiguity subfield 516. The PE disambiguity subfield 516 includes a parameter related to a PE field added to the PPDU (the parameter is used by a receiver to calculate a number of OFDM symbols in the PPDU).

In some embodiments, the HARQ SIG field 500 also includes an error detection (e.g., a cyclic redundancy check (CRC)) subfield 520. A value of the CRC subfield 520 is generated by applying an error detection code (e.g., a CRC code) to information from the other subfields of the HARQ SIG field 500.

Figure 5B:
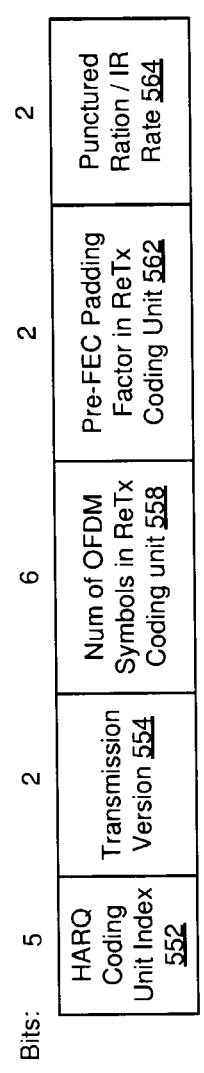
FIG. 5B is a diagram of an example HARQ PSDU information subfield included in the HARQ signal field of FIG. 5A, according to an embodiment

FIG. 5B is a diagram of an example HARQ coding unit information subfield 550 that is included in the HARQ SIG field 500, according to an embodiment. For example, the HARQ coding unit information subfield 550 is used as the HARQ coding unit information subfield 512 of FIG. 5A, according to an embodiment.

The HARQ coding unit information subfield 550 includes an MPDU index subfield 552 and a transmission version subfield 554. In an embodiment, the MPDU index subfield 552 uniquely identifies an MPDU, and the transmission version subfield 554 indicates whether the uniquely identified MPDU is an initial transmission, a first retransmission of the particular MPDU, a second retransmission of the particular MPDU, etc. For example, the transmission version subfield 554 is set to a value of zero to indicate an initial transmission of the MPDU, and is set to a number greater to zero to indicate the corresponding number of the retransmission of the MPDU, in an embodiment. The MPDU index subfield 552 for a particular MPDU remains the same in every (re)transmission of the MPDU, in an embodiment.

The HARQ coding unit information subfield 550 includes a number of OFDM symbols subfield 558 that indicates a number of OFDM symbols in the corresponding HARQ coding unit (e.g., the corresponding coded HARQ PSDU 432), according to an embodiment. The number of OFDM symbols 558 consists of a suitable number, N, of bits, such as six bits or another suitable number of bits. The total number of OFDM symbols in a HARQ coding unit will depend on an error correcting encoding rate that is used, a modulation scheme that is used, and a frequency bandwidth that is used. The MAC processor 126/166 is configured to ensure that an appropriate MAC layer data unit length is used for the error correcting encoding rate, the modulation scheme, and the frequency bandwidth so that the number of OFDM symbols in the HARQ coding unit can be represented by N bits. In another embodiment the number of OFDM symbols subfield 558 is replaced with a time duration field that indicates a time duration value for the corresponding HARQ coding unit (e.g., the corresponding coded HARQ PSDU 432).

The HARQ coding unit information subfield 550 also includes a pre-FEC padding factor subfield 562 that indicates a segment boundary in a last-occurring OFDM symbol of the corresponding HARQ coding unit (e.g., the corresponding coded HARQ PSDU 432), wherein padding bits are added prior to FEC encoding so that the FEC encoded bits end at the indicated segment boundary in the last-occurring OFDM symbol of the corresponding HARQ coding unit (e.g., the corresponding coded HARQ coding unit 432). In other embodiments, the pre-FEC padding factor subfield 562 is omitted from the HARQ coding unit information subfield 550.

The HARQ coding unit information subfield 550 also includes a punctured ratio/IR rate subfield 564, in an embodiment. The punctured ratio/IR rate subfield 564 indicates a puncturing ratio (if comb combining is utilized) or IR rate (if incremental redundancy is utilized) that indicates data that is retransmitted in the corresponding HARQ PSDU, in an embodiment. The punctured ratio/IR rate subfield 564 is generally the same as the punctured ratio/IR rate subfield 368 described with reference to FIG. 3B, in an embodiment. In an embodiment, the punctured ratio/IR rate subfield 564 is included in the HARQ coding unit information subfield 550 if the HARQ coding unit information subfield 550 corresponds to a retransmission HARQ PDSU (e.g., as indicated by a value of greater than zero of the transmission version subfield 554), and is excluded from the HARQ coding unit information subfield 550 if the HARQ coding unit information subfield 550 corresponds to an initial HARQ PDSU (e.g., as indicated by a value of zero of the transmission version subfield 554).

The number indicated above a subfield of the HARQ SIG field 500 in FIGS. 5A-5B indicates a number of bits included in the corresponding subfield according to an example embodiment. In other embodiments, the subfields of the HARQ SIG field 500 include other suitable numbers of bits.

In some embodiments, the HARQ PPDU is an MU PPDU that includes independent information for multiple communication devices. For example, the MU PPDU is to be transmitted using orthogonal frequency division multiple access (OFDMA), MU multiple input, multiple output (MU-MIMO), or a hybrid of both OFDMA and MU-MIMO. Referring now to FIG. 4, when the HARQ PPDU 404 is an MU PPDU, the PHY data portion 440 includes multiple PSDUs for multiple different client stations (in different frequency portions for OFDMA, and/or transmitted via different spatial streams for MU-MIMO), the SIG field 244 has a different format than for an SU PPDU, and the HARQ SIG field 448 has a different format than for an SU PPDU, according to an embodiment.

In some embodiments, MU PPDUs include a further SIG field (not shown in FIG. 4) as compared to SU PPDUs, and this further SIG field is sometimes referred to herein as an "MU SIG field." For instance, in an embodiment, the MU SIG field includes information that indicates an allocation of frequency resource units (RUs) in MU PPDU for client stations to which the MU PPDU is intended, indicates which spatial stream(s) is intended for which client stations, which RUs correspond to which client stations, etc. As an illustrative example, the IEEE 802.11ax Standard defines an HE-SIG-B field that is included in MU PPDUs. In an embodiment, the HARQ SIG field 448 is included after the MU SIG field.

Figure 6A:
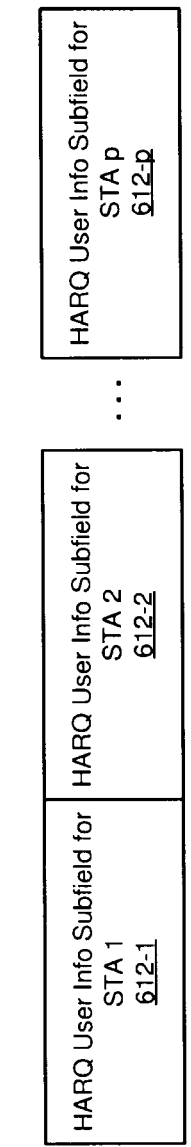
FIG. 6A is a diagram of an example HARQ signal field for a multi-user (MU) PHY data unit, according to an embodiment.

FIG. 6A is a diagram of an example HARQ SIG field 600 that is included in a PHY preamble of an MU HARQ PPDU, according to an embodiment. For example, the HARQ SIG field 600 is used as the HARQ SIG field 448 of FIG. 4 when the HARQ PPDU 204 is an MU HARQ PPDU, according to an embodiment.

In an embodiment, the network interface 122/162 is configured to generate the HARQ SIG field 600. In an embodiment, the PHY processor 130/170 is configured to generate the HARQ SIG field 600. In an embodiment, the HARQ PPDU generator 142/192 is configured to generate the HARQ SIG field 600. In an embodiment, the HARQ SIG field generator 144/194 is configured to generate the HARQ SIG field 600.

The HARQ SIG field 600 includes a respective HARQ user information subfield 612 for each of one or more client stations to which the MU PPDU is to be transmitted, according to an embodiment. As described in more detail below, the HARQ user information subfield 612 includes HARQ-related information for one or more PSDUs to be transmitted to a respective client station.

In an embodiment, an order of the HARQ user information subfields 612 corresponds to an ordering of client stations specified in the MU SIG field (e.g., in an HE-SIG-B field). For example, the MU SIG field (e.g., the HE-SIG-B field) includes allocation information that allocates RUs to client stations, and the allocation information includes a listing of client stations in an order; the order of the HARQ user information subfields 612 corresponds to the order of the listing of client stations in the MU SIG field.

In some embodiments in which a PE field may be added to a PPDU, the HARQ SIG field 600 also includes a PE disambiguity subfield 616. The PE disambiguity subfield 616 includes a parameter related to a PE field added to the PPDU (the parameter is used by a receiver to calculate a number of OFDM symbols in the PPDU).

In some embodiments, the HARQ SIG field 600 also includes an error detection (e.g., a cyclic redundancy check (CRC)) subfield 620. A value of the CRC subfield 620 is generated by applying an error detection code (e.g., a CRC code) to information from the other subfields of the HARQ SIG field 600.

In some embodiments and/or scenarios, the HARQ SIG field 600 also includes padding 624, which will be described in more detail below.

Figure 6B:
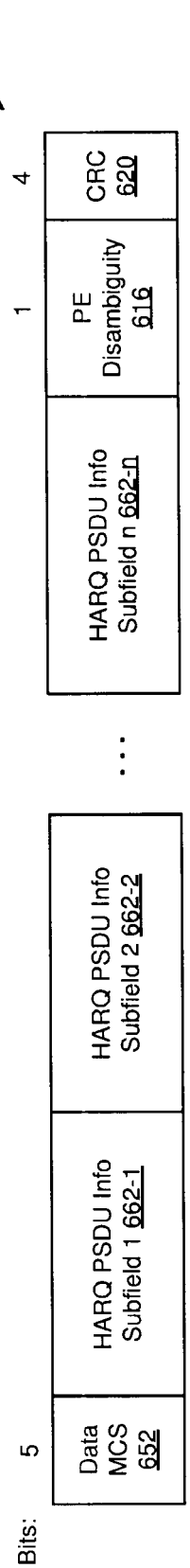
FIG. 6B is a diagram of an example HARQ user information subfield included in the HARQ signal field of FIG. 6A, according to an embodiment.

FIG. 6B is a diagram of an example HARQ user information subfield 650, according to an embodiment. For example, the HARQ user information subfield 650 is used as the HARQ user information subfield 612 of FIG. 6A, according to an embodiment.

The HARQ user information subfield 650 includes an MCS subfield 652 that indicates an MCS used for the PHY data portion of the HARQ PPDU, in an embodiment. The MCS subfield 652 includes a suitable number of bits for specifying an MCS from a suitable set of different MCSs. For example, when the MCS subfield 652 consists of four bits, the set of different MCSs can include up to sixteen different MCSs. As another example, when the MCS subfield 652 consists of three bits, the set of different MCSs can include up to eight different MCSs. Other suitable numbers of bits are used in other embodiments.

The HARQ user information subfield 650 includes a respective HARQ PSDU information subfield 662 for each HARQ PSDU included in the HARQ PPDU for the corresponding client station, according to an embodiment. In an embodiment, an ordering of the HARQ PSDU information subfields 662 corresponds to an ordering of the HARQ PSDUs in the HARQ PPDU for the corresponding client station. For example, a first occurring HARQ PSDU information subfield 662 corresponds to a first occurring HARQ PSDU, a second occurring HARQ PSDU information subfield 662 corresponds to a second occurring HARQ PSDU, and so on. In an embodiment, the HARQ PSDU information subfield 662 is generally the same as the HARQ PSDU information subfield 350 of FIG. 3B. In another embodiment, the HARQ PSDU information subfield 662 is different from the HARQ PSDU information subfield 350 of FIG. 3B.

In some embodiments in which a PE field may be added to a PPDU, the HARQ user information subfield 650 also includes a PE disambiguity subfield 616. The PE disambiguity subfield 616 includes a parameter related to a PE field added to the PPDU (the parameter is used by a receiver to calculate a number of OFDM symbols in the PPDU).

In some embodiments, the HARQ user information subfield 650 also includes an error detection (e.g., a cyclic redundancy check (CRC)) subfield 620. A value of the CRC subfield 660 is generated by applying an error detection code (e.g., a CRC code) to information from the other subfields of the HARQ user information subfield 650.

Figure 6C:
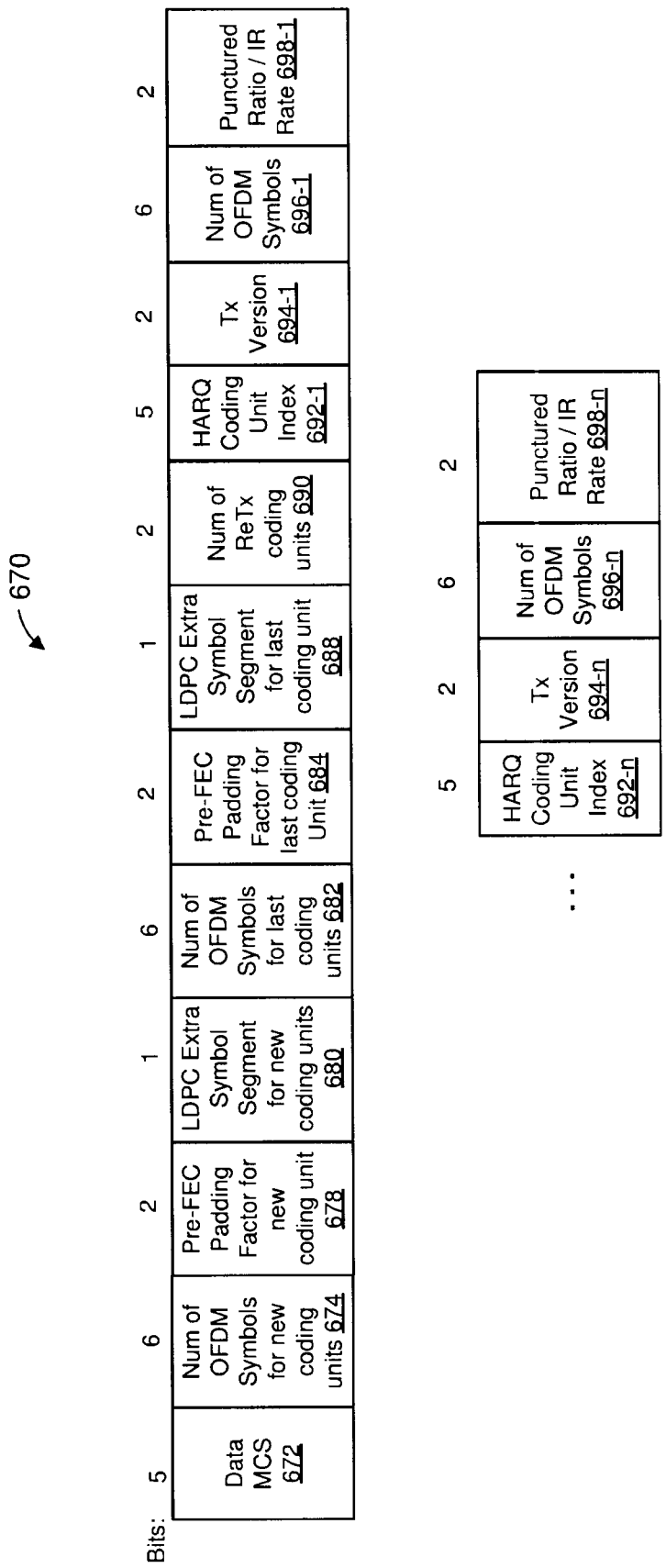
FIG. 6C is a diagram of another example HARQ user information subfield included in the HARQ signal field of FIG. 6A, according to another embodiment.

FIG. 6C is a diagram of an example HARQ user information subfield 670, according to another embodiment. For example, the HARQ user information subfield 670 is used as the HARQ user information subfield 612 of FIG. 6A, according to an embodiment.

The HARQ user information subfield 670 includes a data MCS subfield 672 to that indicates an MCS used for the client station in the PHY data portion of the MU HARQ PPDU.

A number of OFDM symbols for new coding units subfield 674 indicates a number of OFDM symbols in the HARQ PPDU for the new coding unit for the client station, except for the last-occurring new coding unit in the HARQ PPDU for the client station. A pre-FEC padding factor subfield 678 indicates a segment boundary in a last-occurring OFDM symbol of the new coding unit, wherein padding bits are added prior to FEC encoding so that the FEC encoded bits end at the indicated segment boundary in the last-occurring OFDM symbol of each new HARQ coding unit except for the last-occurring new HARQ coding unit. An LDPC extra symbol segment subfield for new coding unit 680 indicates whether an extra OFDM symbol segment is included for pre-FEC padding when LDPC is used for the HARQ PPDU.

A number of OFDM symbols for last coding unit subfield 682 indicates a number of OFDM symbols used for the last-occurring new coding unit included for the client station in the HARQ PPDU. A pre-FEC padding factor for last coding unit subfield 684 indicates a segment boundary in a last-occurring OFDM symbol of the last-occurring new coding unit, wherein padding bits are added prior to FEC encoding so that the FEC encoded bits end at the indicated segment boundary in the last-occurring OFDM symbol of the last-occurring new HARQ coding unit.

An LDPC extra symbol segment for last coding unit subfield 688 indicates whether an extra OFDM symbol segment for pre-FEC padding is included in the last-occurring coding unit when LDPC is used for the HARQ PPDU. A number of retransmission coding units subfield 690 indicates a number of retransmission HARQ coding units included for the client station in the HARQ PPDU. A respective HARQ coding unit index subfield 692 identifies a respective HARQ coding unit included for the client station in the HARQ PPDU. A respective transmission version subfield 694 indicates a transmission number of the retransmission HARQ coding unit included for the client station in the HARQ PPDU. A respective number of OFDM symbols subfield 696 indicates a number of OFDM symbols for each respective retransmission HARQ coding unit, in an embodiment.

A respective punctured ratio/IR rate subfield 698 is included in the HARQ user information subfield 670 for a respective retransmission HARQ coding unit, and is omitted from the HARQ user information subfield 670 for a respective new coding unit, in an embodiment. The punctured ratio/IR rate subfield 698 indicates a puncturing ratio (if comb combining is utilized) or IR rate (if incremental redundancy is utilized) that indicates data that is retransmitted in the corresponding HARQ PSDU, in an embodiment. The punctured ratio/IR rate subfield 698 is generally the same as the punctured ratio/IR rate subfield 368 described with reference to FIG. 3B, in an embodiment.

The number indicated above a subfield of the HARQ SIG field 600 in FIGS. 6A-6B indicates a number of bits included in the corresponding subfield according to an example embodiment. In other embodiments, the subfields of the HARQ SIG field 500 include other suitable numbers of bits.

Figure 7:
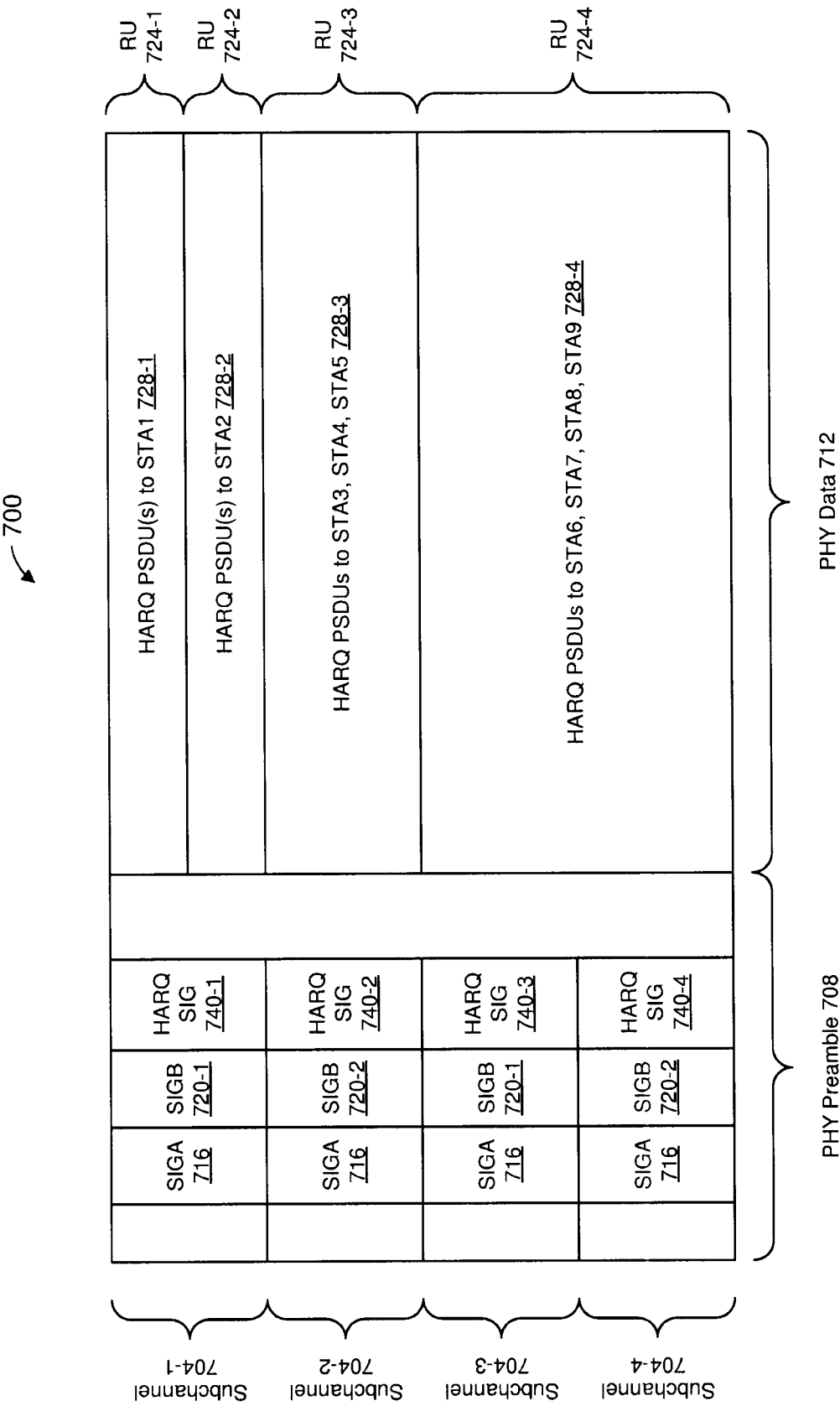
FIG. 7 is a diagram an example MY PHY data unit that includes individually encoded HARQ PHY PSDUs in a PHY data portion, and ii) a PHY preamble with HARQ signal fields, according to an embodiment.

FIG. 7 is a diagram of an example MU HARQ PPDU 700, according to an embodiment. In an embodiment, the network interface 122/162 is configured to generate the MU HARQ PPDU 700. In an embodiment, the PHY processor 130/170 is configured to generate the MU HARQ PPDU 700. In an embodiment, the HARQ PPDU generator 142/192 is configured to generate the MU HARQ PPDU 700.

In the example illustrated in FIG. 7, the MU HARQ PPDU 700 spans four frequency subchannels 704. In other scenarios, the MU HARQ PPDU 700 spans another suitable number of frequency subchannels 704, such as 1, 2, 3, 5, 6, 7, 8, etc.

The MU HARQ PPDU 700 comprises a PHY preamble portion 708 and a PHY data portion 712. The PHY preamble portion 708 comprises a plurality of suitable training signals (not shown). Additionally, the PHY preamble portion 708 comprises a SIG field (SIGA field) 716. An instance of the SIGA field 716 is transmitted in each frequency subchannel 704, according to an embodiment. The SIGA field 716 corresponds to the SIG field 244 discussed above, according to an embodiment.

Additionally, the PHY preamble portion 708 comprises a SIG field (SIGB field) 720. The SIGB field 720 corresponds to the MU SIG field discussed above, according to an embodiment. In the example illustrated in FIG. 7, two versions of the SIGB field 720 are transmitted. In particular, SIGB field version 720-1 is transmitted in frequency subchannels 704-1 and 704-3, and SIGB field version 720-2 is transmitted in frequency subchannels 704-2 and 704-4. In other scenarios (e.g., in which the MU HARQ PPDU 700 spans another suitable number of frequency subchannels), different suitable numbers of versions of the SIGB field 720 are transmitted, such as 1, 4 etc.

The SIGB field 720 includes allocation information that indicates an allocation of frequency RUs 724. In an embodiment, each version of the SIGB field 720 includes allocation information for frequency RUs 724 that overall the frequency subchannels in which the version of the SIGB field 720 is transmitted. For instance, in the illustrative example of FIG. 7, SIGB field 720-1 includes allocation information for RU 724-1, RU 724-2, and RU 724-4, and SIGB field 720-2 includes allocation information for RU 724-3 and RU 724-4.

In the illustrative example of FIG. 7, RU 724-1 is allocated to a first client station (STA1); RU 724-2 is allocated to a second client station (STA2); RU 724-3 is allocated to three client stations (STA3, STA4, STA5) for an MU-MIMO transmission; and RU 724-4 is allocated to four client stations (STA6, STA7, STA8, STA9) for an MU-MIMO transmission. In the illustrative example of FIG. 7, allocation information in SIGB field 720-1 includes an ordering of client stations for RU 724-1, RU 724-2, and RU 724-4, and allocation information in SIGB field 720-2 includes an ordering of client stations for RU 724-3 and RU 724-4.

The PHY data portion 712 includes a plurality of HARQ PSDUs 728 for multiple client stations. In the illustrative example of FIG. 7, one or more HARQ PSDUs 728-1 are transmitted to STA1 in RU 724-1; one or more HARQ PSDUs 728-2 are transmitted to STA2 in RU 724-2; a plurality of HARQ PSDUs 728-3 are transmitted to STA3, STA4, and STA5 in RU 724-3 using MU-MIMO; and a plurality of HARQ PSDUs 728-4 are transmitted to STA6, STA7, STA8, and STA9 in RU 724-4 using MU-MIMO.

The PHY preamble portion 708 comprises a plurality of HARQ SIG fields 740. In the example illustrated in FIG. 7, four HARQ SIG fields 740 are transmitted, each corresponding to a frequency subchannel 704. In particular, RU HARQ SIG field 740-1 is transmitted in frequency subchannel 704-1; RU HARQ SIG field 740-2 is transmitted in frequency subchannel 704-2; RU HARQ SIG field 740-3 is transmitted in frequency subchannel 704-3; and RU HARQ SIG field 740-4 is transmitted in frequency subchannel 704-4. In other scenarios (e.g., in which the MU HARQ PPDU 700 spans another suitable number of frequency subchannels 704), different suitable numbers of versions of the HARQ SIG field 740-1 are transmitted, such as 1, 2, 3, 5, 6, 7, 8, etc.

In an embodiment, each RU HARQ SIG field 740 includes HARQ-related information for HARQ PSDUs to be transmitted within the corresponding frequency subchannel 704, but does not include HARQ-related information for HARQ PSDUs to be transmitted within other frequency subchannels 704. For example, HARQ SIG field 740-1 includes HARQ-related information for HARQ PSDU(s) 728-1 and HARQ PSDU(s) 728-2; HARQ SIG field 740-2 includes HARQ-related information for HARQ PSDUs 728-3; and HARQ SIG field 740-3 and HARQ SIG field 740-4 include HARQ-related information for HARQ PSDUs 728-4 (for example, the HARQ-related information for HARQ PSDUs 728-4 is divided between HARQ SIG field 740-3 and HARQ SIG field 740-4).

In another embodiment, the same HARQ SIG field 740 is transmitted in each subchannel 704, and the HARQ SIG field 740 includes HARQ-related information for all HARQ PSDUs to be transmitted within the HARQ PPDU 700.

In the illustrative example of FIG. 7, the different HARQ SIG fields 740 may include different numbers of bits. Thus, padding (e.g., padding 424, FIG. 4A) may be added to one or more HARQ SIG fields 740 so that all of the HARQ SIG fields 740 span a same number of OFDM symbols. In an embodiment, the SIGA field 716 includes an indication of a number of OFDM symbols for the HARQ SIG fields 740, and padding (e.g., padding 424, FIG. 4A) is added to one or more HARQ SIG fields 740 so that all of the HARQ SIG fields 740 span the number of OFDM symbols indicated in the SIGA field 716.

Trigger-based PPDUs are transmitted in response to a trigger frame. For example, an AP transmits a trigger frame to prompt one or more client stations to transmit one or more trigger-based PPDUs. Transmission of a trigger-based PPDU begins a defined time period (e.g., a short interface space (SIFS) as defined by the IEEE 802.11 Standard, or another suitable time period) after receipt of an end of a PPDU that includes the trigger frame, in an embodiment.

Figure 8A:
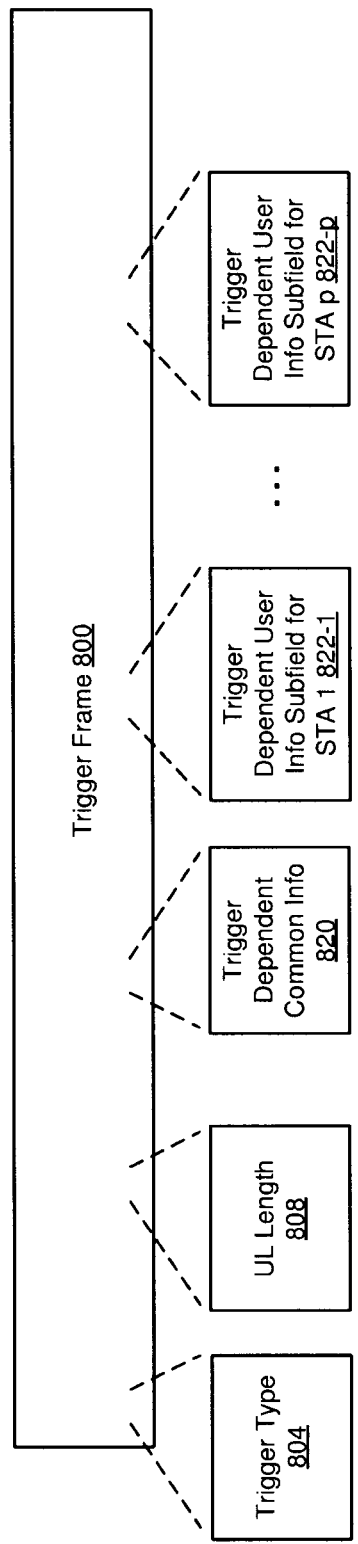
FIG. 8A is a diagram of an example trigger frame for triggering one or more communication devices to transmit one or more trigger-based PHY data units that include individually encoded HARQ PSDUs, according to an embodiment.

FIG. 8 is a diagram of an example trigger frame 800 that is configured to prompt one or more client stations to transmit one or more trigger-based HARQ PPDUs, according to an embodiment. In an embodiment, the trigger frame 800 is a MAC layer data unit (e.g., an MPDU). In an embodiment, the network interface 122/162 is configured to generate the trigger frame 800. In an embodiment, the MAC processor 126/166 is configured to generate the trigger frame 800.

The trigger frame 800 includes a trigger type field 804 that indicates a type of trigger frame from a plurality of different trigger types. For example, the current draft of the IEEE 802.11ax Standard defines eight different trigger types indicated by values 0-7 of a trigger type field, with values 8-15 reserved. In an embodiment, an additional trigger type is defined for a trigger frame that prompts one or more client stations to transmit one or more trigger-based HARQ PPDUs. In an illustrative embodiment, a value 8 of the trigger type field indicates that the trigger frame 800 is for prompting one or more client stations to transmit one or more trigger-based HARQ PPDUs. In other embodiments, another suitable value other than 8 is used, such as any of 9-15, or any other suitable value.

An uplink (UL) length field 808 indicates a duration of the trigger-based HARQ PPDU that is to be transmitted in response to the trigger frame 800. The AP 114 determines (e.g., the network interface 122 determines, the MAC processor 126 determines, etc.) the duration based on client station data buffer sizes known to the AP 114, the client station data buffer sizes indicating how much data each client station has to transmit to the AP 114. Since AP 114 has knowledge of the data buffer size of each client station, but the AP does not know a number of MPDUs each STA will include in the trigger-based HARQ PPDU, it is difficult for AP 114 to calculate an accurate UL length when each MPDU is individually encoded (as in a HARQ PPDU). In one embodiment, the AP 114 calculates (e.g., the network interface 122 calculates, the MAC processor 126 calculates, etc.) the UL length based on i) the data buffer sizes of the client stations and ii) any extra OFDM symbols when taking extra pre-FEC padding and post-FEC padding of each coded PSDU into account. In one embodiment, if a client station cannot fit all PSDUs into the trigger-based HARQ PPDU duration specified by the UL length field 808, the client station will aggregate as many PSDUs that can be included in the trigger-based HARQ PPDU, and then add padding to reach the duration specified by the UL length field 808. In another embodiment, if a client station cannot fit all PSDUs into the trigger-based HARQ PPDU duration specified by the UL length field 808, the client station fragments a last-occurring MPDU into two segments; the client station includes a first segment in the trigger-based HARQ PPDU, and includes a second segment in a subsequent HARQ PPDU.

In an embodiment, the trigger frame 800 includes a trigger dependent common information field 820 that is specific to trigger frames that are for prompting one or more client stations to transmit one or more trigger-based HARQ PPDUs. In an embodiment, the trigger dependent common information field 820 includes i) a duration subfield that specifies a number of OFDM symbols to be included in the trigger-based HARQ PPDU that is to be transmitted in response to the trigger frame 800, ii) a pre-FEC padding factor subfield that indicates to client station(s) a segment boundary in a last-occurring OFDM symbol of the trigger-based HARQ PPDU, wherein the client stations add padding bits prior to FEC encoding so that the FEC encoded bits end at the indicated segment boundary in the last-occurring OFDM symbol, and iii) an LDPC extra symbol segment subfield that indicates whether client station(s) should include an extra OFDM symbol segment for pre-FEC padding when LDPC is used for the trigger-based HARQ PPDU.

In an embodiment, the trigger frame 800 includes allocation information that indicates which client station(s) are to transmit trigger-based HARQ PPDUs in response to the trigger frame 800. In an embodiment, the allocation information also indicates the RUs assigned to the client station(s) for the trigger-based HARQ PPDUs.

In an embodiment, only one client station is assigned to each RU. In another embodiment, multiple client stations are permitted to be assigned to a single RU.

Figure 8B:
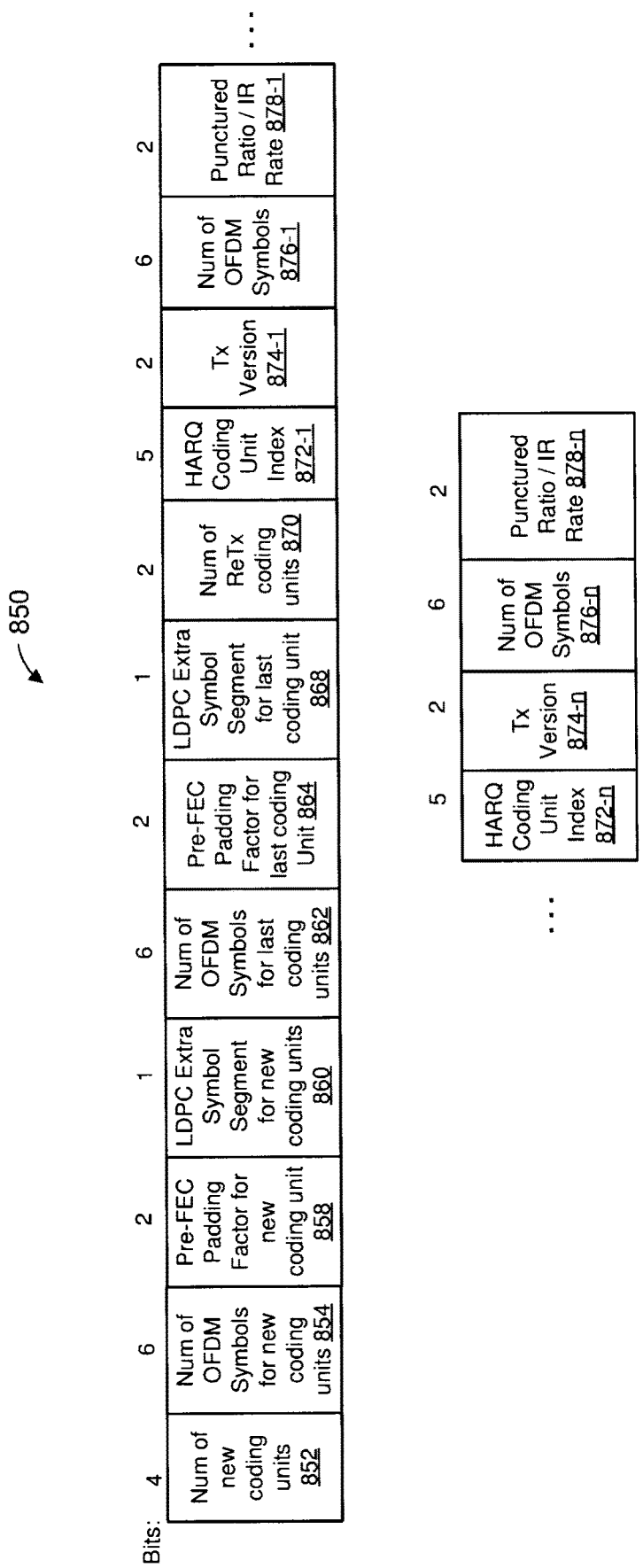
FIG. 8B is an example trigger dependent user information subfield included in the trigger frame of FIG. 8A, according to an embodiment.

In an embodiment, the trigger frame 800 also includes a respective trigger dependent user information subfield 822 for each of the client station(s). FIG. 8B is an example trigger dependent user information subfield 850, according to an embodiment. For example, the example trigger dependent user information subfield 850 is used as the trigger dependent user information subfield 822 of FIG. 8A, according to an embodiment.

A number of new coding units subfield 852 indicates a number of initial HARQ coding units to be included in the trigger-based HARQ PPDU. A number of OFDM symbols for new coding units subfield 854 indicates a number of OFDM symbols to be used for each of the new HARQ coding units to be included in the trigger-based HARQ PPDU except for the last-occurring new coding unit to be included in the trigger-based HARQ PPDU. A pre-FEC padding factor subfield 858 indicates a segment boundary in a last-occurring OFDM symbol of the new coding unit, wherein the client station adds padding bits prior to FEC encoding so that the FEC encoded bits end at the indicated segment boundary in the last-occurring OFDM symbol of each new HARQ coding unit except for the last-occurring new HARQ coding unit.

An LDPC extra symbol segment subfield 860 indicates whether the client station should include an extra OFDM symbol segment for pre-FEC padding when LDPC is used for the trigger-based HARQ PPDU. In an embodiment, to facilitate symbol alignment among different STAs for the trigger-based HARQ PPDU (the AP does not have knowledge of number of MPDUs each client station will include in the trigger-based HARQ PPDU), the LDPC Extra Segment subfield 860 is set to one, according to an embodiment. In response to the LDPC Extra Segment subfield 860 being set to one, a client station receiving the trigger frame 800 will include an extra OFDM symbol segment in a last-occurring OFDM symbol of a last-occurring coded HARQ PSDU in the trigger-based HARQ PPDU, according to an embodiment.

A number of OFDM symbols for last coding unit subfield 862 indicates a number of OFDM symbols to be used for the last-occurring new coding unit to be included in the trigger-based HARQ PPDU. A pre-FEC padding factor for last coding unit subfield 864 indicates a segment boundary in a last-occurring OFDM symbol of the last-occurring new coding unit, wherein the client station adds padding bits prior to FEC encoding so that the FEC encoded bits end at the indicated segment boundary in the last-occurring OFDM symbol of the last-occurring new HARQ coding unit.

An LDPC extra symbol segment for last coding unit subfield 868 indicates whether the client station should include an extra OFDM symbol segment for pre-FEC padding in the last-occurring coding unit when LDPC is used for the trigger-based HARQ PPDU. In an embodiment, to facilitate symbol alignment among different STAs for the trigger-based HARQ PPDU (the AP does not have knowledge of number of MPDUs each client station will include in the trigger-based HARQ PPDU), the LDPC Extra Segment subfield 860 is set to one, according to an embodiment. In response to the LDPC Extra Segment subfield 860 being set to one, a client station receiving the trigger frame 800 will include an extra OFDM symbol segment in a last-occurring OFDM symbol of a last-occurring coded HARQ PSDU in the trigger-based HARQ PPDU, according to an embodiment.

A number of retransmission coding units subfield 870 indicates a number of retransmission HARQ coding units to be included in trigger-based HARQ PPDU. In an embodiment, the client station includes the number of retransmission HARQ coding units indicated in the number of retransmission coding units subfield 870 at the beginning of the trigger-based HARQ PPDU, followed by the number of new HARQ coding units indicated in the number of new coding units subfield 852. A respective HARQ coding unit index subfield 872 identifies a HARQ coding unit to be included in trigger-based HARQ PPDU. A respective transmission version subfield 874 indicates a transmission number of the retransmission HARQ coding unit to be included in trigger-based HARQ PPDU. A respective number of OFDM symbols subfield 876 indicates a number of OFDM symbols for each respective retransmission HARQ coding unit. A respective punctured ratio/IR rate subfield 876 indicates a puncturing ratio or IR rate that determines data that is retransmitted in each respective retransmission HARQ coding unit, in an embodiment.

The number indicated above a subfield of the trigger dependent user information subfield 850 in FIGS. 6A-6B indicates a number of bits included in the corresponding subfield according to an example embodiment. In other embodiments, the subfields of the trigger dependent user information subfield 850 include other suitable numbers of bits.

Figure 9:
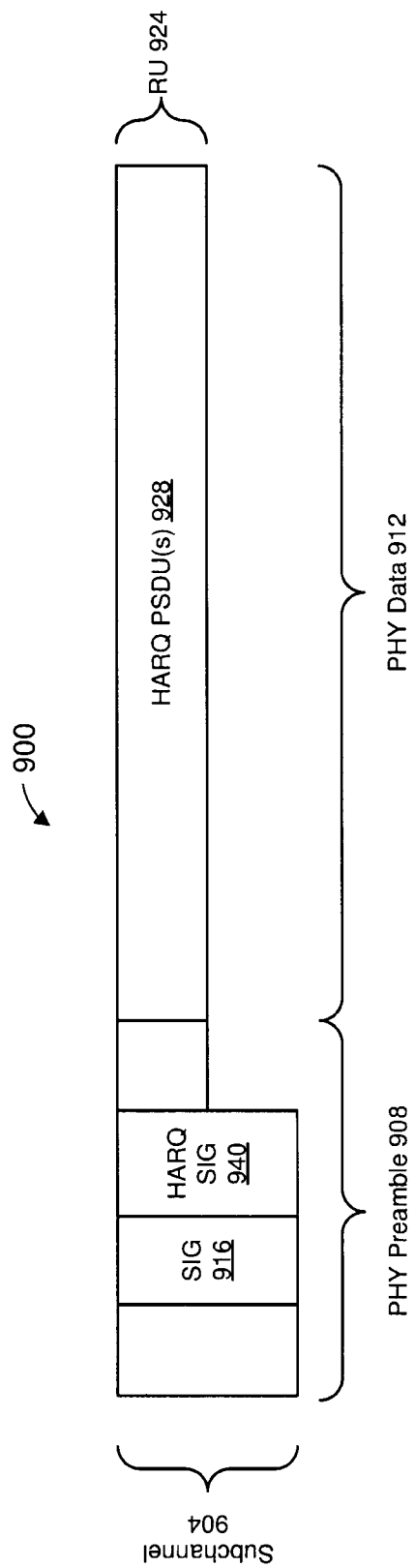
FIG. 9 is a diagram of an example trigger-based PHY data unit that includes individually encoded HARQ PSDUs, according to an embodiment.

FIG. 9 is a diagram of an example trigger-based HARQ PPDU 900 transmitted by a client station, according to an embodiment. In an embodiment, the trigger-based HARQ PPDU 900 is transmitted in response to the trigger frame 800 of FIG. 8. In another embodiment, the trigger-based HARQ PPDU 900 is transmitted in response to another trigger frame that indicates a trigger-based HARQ PPDU is to be transmitted.

In an embodiment, the network interface 122/162 is configured to generate the trigger-based HARQ PPDU 900. In an embodiment, the PHY processor 130/170 is configured to generate the trigger-based HARQ PPDU 900. In an embodiment, the HARQ PPDU generator 142/192 is configured to generate the trigger-based HARQ PPDU 900.

As discussed above, a trigger frame indicates the RU(s) via which the trigger-based HARQ PPDU 900 is to be transmitted. In the example illustrated in FIG. 9, the trigger-based HARQ PPDU 900 is included in one frequency subchannel 904. In other scenarios, the trigger-based HARQ PPDU 900 is included within another suitable number of frequency subchannels 904, such as 1, 2, 3, 5, 6, 7, 8, etc. The trigger-based HARQ PPDU 900 comprises a PHY preamble portion 908 and a PHY data portion 912. The PHY preamble portion 908 comprises a plurality of suitable training signals (not shown). Additionally, the PHY preamble portion 908 comprises a SIG field 916. An instance of the SIG field 916 is transmitted in each frequency subchannel 904 in which the trigger-based HARQ PPDU 900 is included, according to an embodiment. In an embodiment, the SIG field 916 indicates whether the PPDU 900 includes a HARQ SIG field. In another embodiment, the SIG field 916 does not indicates whether the PPDU 900 includes a HARQ SIG field. For example, because the trigger-based HARQ PPDU 900 is transmitted in response to a trigger frame that instructs the client station to transmit a trigger-based HARQ PPDU, the AP knows that the PPDU 900 includes a HARQ SIG field.

In the illustrative example of FIG. 9, the trigger frame specified that the client station is to utilize the RU 924. Thus, the PHY data portion 912 includes one or more HARQ PSDUs 928 transmitted within the RU 924.

The PHY preamble portion 908 also comprises a HARQ SIG field 940. In an embodiment, the HARQ SIG field 940 is transmitted within the frequency subchannel 904. In an embodiment, a duration of the HARQ SIG field 940 corresponds to a duration indicated in the trigger frame that prompts transmission of the trigger-based HARQ PPDU 900, and the SIG field 916 does not indicate a duration of the HARQ SIG field 940. In another embodiment, the SIG field 916 indicates a duration of the HARQ SIG field 940 such as the SIG field 244 described above.

In an embodiment, the HARQ SIG field 940 has a format similar to the HARQ SIG field 300 discussed with reference to FIGS. 3A and 3B or the HARG SIG field 500 discussed with reference to FIGS. 5A and 5B, except that the HARQ SIG field 940 does not include a PE disambiguity subfield and a last-occurring HARQ PSDU information subfield does not include a pre-FEC padding factor subfield and does not include an LDPC extra symbol segment subfield. For example, in an embodiment in which the trigger frame instructs the client station regarding a pre-FEC padding factor and an LDPC extra OFDM symbol segment (e.g., as discussed above with reference to FIG. 6), the AP knows the pre-FEC padding factor for the last-occurring HARQ PSDU in the trigger based HARQ PPDU 900 and whether the last-occurring HARQ PSDU includes an extra OFDM symbol segment in a last-occurring OFDM symbol in the last-occurring coded HARQ PSDU.

In an embodiment, the HARQ SIG field 940 has a format similar to the HARQ SIG field 300 discussed with reference to FIGS. 3A and 3C or the HARG SIG field 500 discussed with reference to FIGS. 5A and 5B, except that the HARQ SIG field 940 does not include a PE disambiguity subfield.

Figure 10:
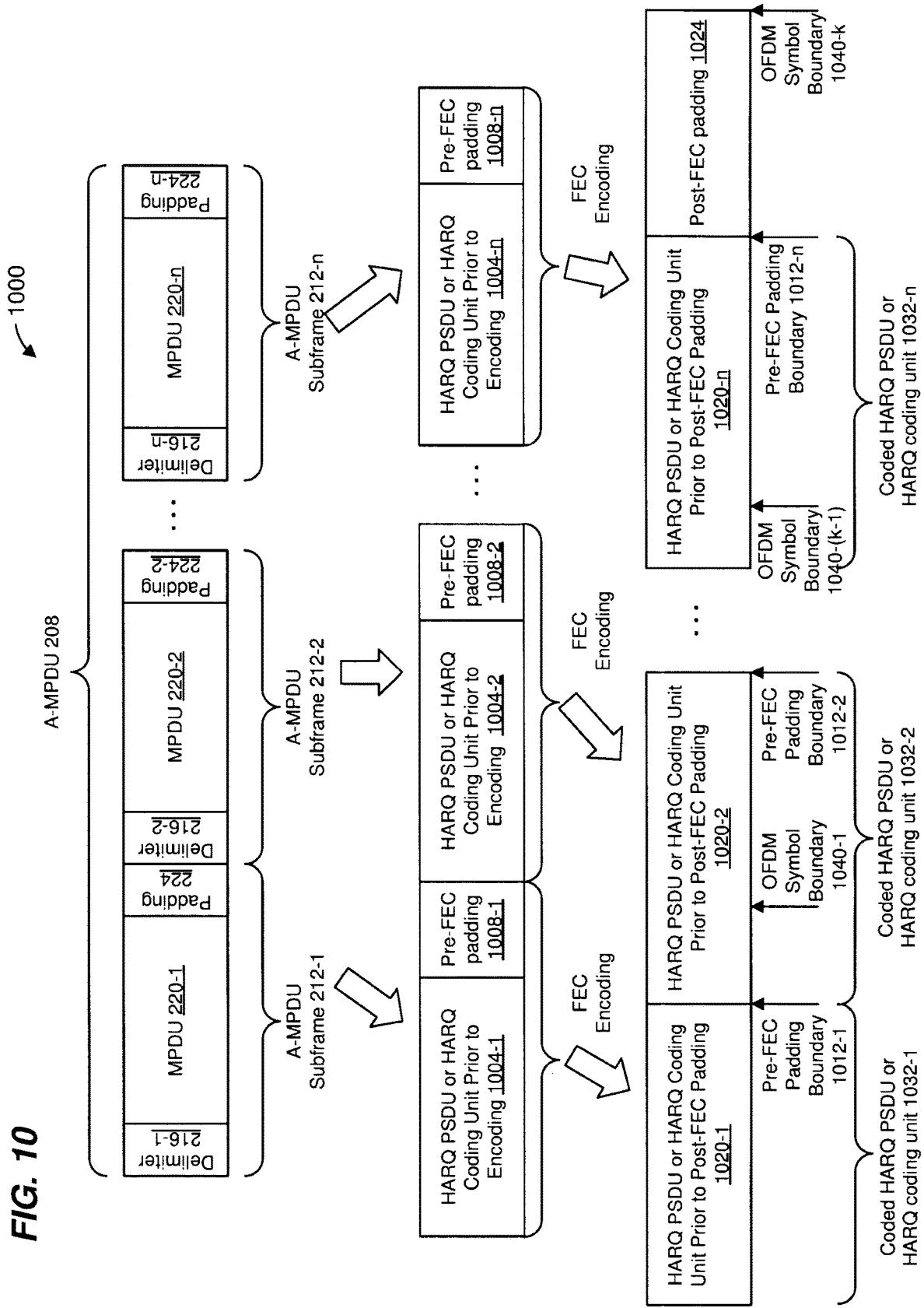
FIG. 10 is a diagram an example process for individually encoding PSDUs or coding units to be included in a PHY data unit, according to another embodiment.

FIG. 10 is a diagram an example process 1000 for individually encoding PSDUs to be included in a HARQ PPDU, according to an embodiment. The network interface 122/162 is configured to perform the process 1000, according to an embodiment. The PHY processor 126/166 is configured to perform the process 1000, according to an embodiment. The HARQ PPDU generator 142/192 is configured to perform the process 1000, according to an embodiment. In other embodiments, another suitable WLAN network interface performs the process 1000.

The A-MPDU 208 is the same as the A-MPDU 208 discussed with reference to FIG. 2 and is not discussed in detail again for purpose of brevity. Each A-MPDU subframe 212 corresponds to respective PSDU 1004 prior to FEC encoding and prior to pre-FEC padding, in an embodiment. In another embodiment, each set of one or more A-MPDU subframes 212 corresponds to a common-length HARQ coding unit 1004 prior to FEC encoding and prior to pre-FEC padding.

As illustrated in FIG. 10, pre-FEC padding bits 1008 are added to each PSDU (or each coding unit) prior to FEC encoding. In an embodiment, for each PSDU (or each coding unit) a corresponding pre-FEC padding boundary 1012 within a last-occurring OFDM symbol for the PSDU is selected, and an amount of pre-FEC padding bits 1008 is determined so that, after the PSDU (or coding unit) 1004 and the pre-FEC padding bits 1008 are FEC encoded, an encoded PSDU (or coding unit 1020) will end at the corresponding pre-FEC padding boundary 1012. In various embodiments, FEC encoding comprises BCC encoding, LDPC encoding, or some other suitable FEC encoding.

In some embodiments, determining an amount of pre-FEC padding bits includes determining whether an extra OFDM symbol segment is to be added to a last-occurring OFDM symbol of the coded HARQ PSDU/HARQ coding unit when LDPC encoding is used, and indicating in a corresponding LDPC extra symbol segment subfield in the HARQ SIG field whether the extra OFDM symbol segment is added in the last-occurring OFDM symbol, as discussed above.

After the PSDU 1004 and the pre-FEC padding bits 1008 are FEC encoded, post-FEC padding bits 1024 are added after a last-occurring coded HARQ PSDU/HARQ coding unit 1232 so that the HARQ PPDU/HARQ coding unit ends at an OFDM symbol boundary.

In various embodiments, an indication of the selected pre-FEC padding boundary 1012 for each coded HARQ PSDU/HARQ coding unit 1032 is indicated in a corresponding pre-FEC padding factor subfield in the HARQ SIG field, as discussed above.

Figure 11:
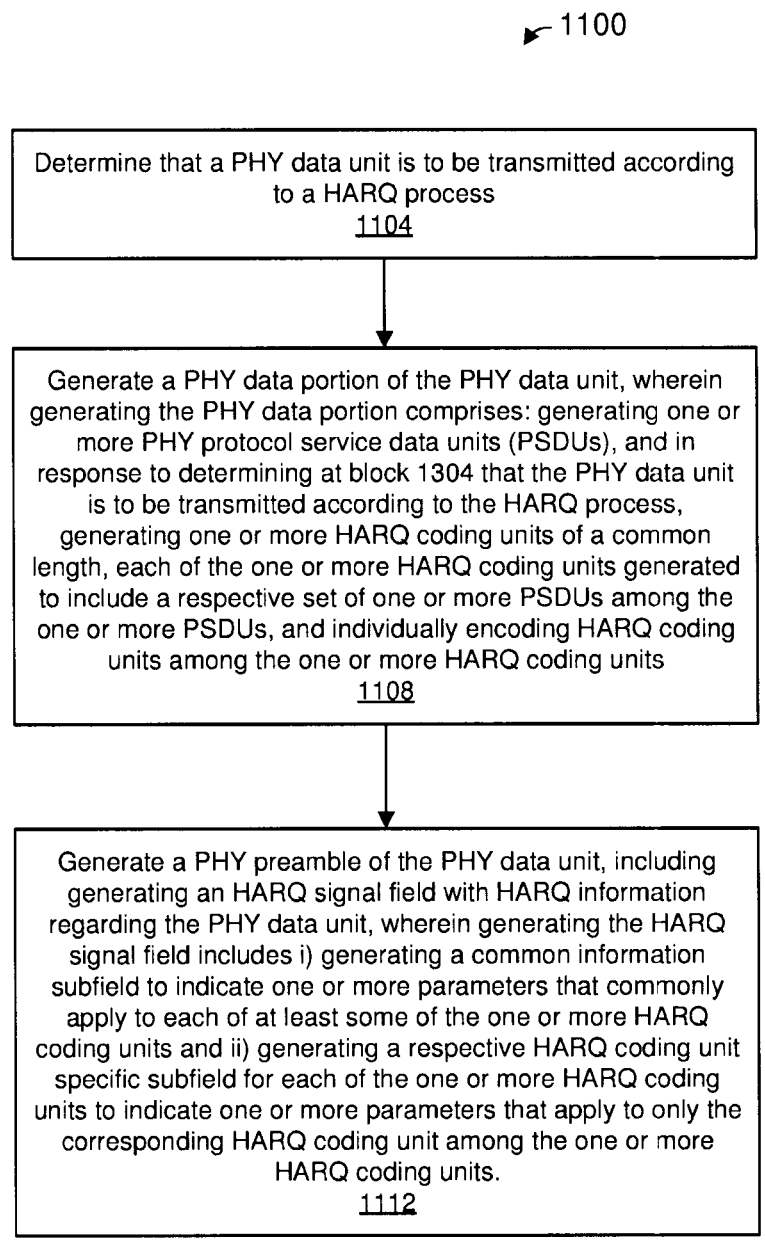
FIG. 11 is a flow diagram of an example method for generating a PHY data unit that includes i) a plurality of individually encoded HARQ coding units in a PHY data portion, and ii) a PHY preamble with a HARQ signal field, according to another embodiment.

FIG. 11 is a flow diagram of an example method 1100 for generating a HARQ PPDU, according to an embodiment. In some embodiments, the network interface 122/162 is configured to implement the method 1100. In some embodiments, the PHY processor 130/170 is configured to implement at least a portion of the method 1100. In an embodiment, the HARQ PPDU generator 142/192 is configured to implement at least a portion of the method 1100.

At block 1104, a communication device determines (e.g., the network interface 122/162 determines, the MAC processor determines 126/166 determines, the PHY processor 130/170 determines, etc.) that a PHY data unit is to be transmitted according to a HARQ process. For example, the communication device performs a negotiation with another communication and agrees that the communication device is to transmit a HARQ PPDU to the other communication device based on the negotiation, according to an embodiment. As another example, the communication device receives a trigger frame from another communication where the trigger frame instructs the communication device to transmit trigger-based HARQ PPDU, according to another embodiment.

At block 1108, the communication device generates (e.g., the network interface 122/162 generates, the PHY processor 130/170 generates, the HARQ PPDU generator 142/192 generates, etc.) a PHY data portion of the PHY data unit. In an embodiment, generating the PHY data portion at block 1108 includes generating one or more PHY protocol service data units (PSDUs). In another embodiment, generating the PHY data portion at block 1108 includes generating a plurality of PSDUs.

In an embodiment, generating the PHY data portion of the PHY data unit at block 1108 additionally includes, in response to determining that the PHY data unit is to be transmitted according to the HARQ process, generating one or more HARQ coding units of a common length, each of the one or more HARQ coding units generated to include a respective set of one or more PSDUs among the one or more PSDUs, and individually encoding HARQ coding units among the one or more HARQ coding units. In an embodiment, individually encoding each HARQ coding unit at block 1108 comprises individually encoding each HARQ coding unit with a BCC encoder. In another embodiment, individually encoding each HARQ coding unit at block 1208 comprises individually encoding each PSDU with an LDPC encoder.

At block 1112, the communication device generates (e.g., the network interface 122/162 generates, the PHY processor 130/170 generates, the HARQ PPDU generator 142/192 generates, etc.) a PHY preamble of the PHY data unit. Generating the PHY preamble at block 812 includes generating a HARQ signal field with HARQ information regarding the PHY data unit. In an embodiment, generating the HARQ signal field includes i) generating a common information subfield to indicate one or more parameters that commonly apply to each of at least some of the one or more HARQ coding units and ii) generating a respective HARQ coding unit information subfield for each of the one or more HARQ coding units to indicate one or more parameters that apply to only the corresponding HARQ coding unit among the one or more HARQ coding units. Generating the common-length HARQ coding units at block 1108, and including the one or more parameters that commonly apply to each of at least one of the one or more HARQ coding units in the common information subfield of the HARQ signal field at block 1112, rather than including corresponding parameters (that do not commonly apply to each of at least some coding units, for example) in each respective HARQ coding unit information subfield, generally reduces overhead associated with transmission of the HARQ signal field, in at least some embodiments.

In an embodiment, a method for generating a physical layer (PHY) data unit for transmission in a wireless local area network (WLAN) includes determining, at a communication device, that the PHY data unit is to be transmitted according to a hybrid automatic repeat request (HARQ) process, and generating, at the communication device, a PHY data portion of the PHY data unit. Generating the PHY data portion comprises generating one or more PHY protocol service data units (PSDUs), and in response to determining that the PHY data unit is to be transmitted according to the HARQ process, generating one or more HARQ coding units of a common length, each of the one or more HARQ coding units generated to include a respective set of one or more PSDUs among the one or more PSDUs, and individually encoding HARQ coding units among the one or more HARQ coding units. The method also includes generating, at the communication device, a PHY preamble of the PHY data unit, including generating a HARQ signal field with HARQ information regarding the PHY data unit, wherein generating the HARQ signal field includes i) generating a common information subfield to indicate one or more parameters that commonly apply to each of at least some of the one or more HARQ coding units and ii) generating a respective HARQ coding unit information subfield for each of the one or more HARQ coding units to indicate one or more parameters that apply to only the corresponding HARQ coding unit among the one or more HARQ coding units.

In other embodiments, the method also includes one of, or any suitable combination of two or more of, the following features.

Generating the common information subfield field comprises generating the common information subfield to include a duration indication to indicate the common length of the one or more HARQ coding units.

Generating the common information subfield field comprises generating the common information subfield to include padding information that indicates a number of padding bits that were added to each of the one or more HARQ coding units.

Generating the common information subfield field comprises generating the common information subfield to include an indicator of whether an extra OFDM symbol segment was included for each of the one or more HARQ coding unit in connection with low density parity check (LDPC) encoding of information in the HARQ coding unit.

Generating the respective HARQ coding unit information subfields comprises generating a particular HARQ coding unit information subfield to include i) an index uniquely identifying the corresponding HARQ coding unit and ii) a transmission version indicator indicating a) that the corresponding HARQ coding unit is an initial transmission of the HARQ coding unit or b) a transmission number corresponding to a retransmission of the corresponding HARQ coding unit.

Generating the one or more HARQ coding unit comprises generating at least one HARQ coding unit to include an initial transmission of one or more PSDUs and at least one HARQ coding unit to include a HARQ retransmission of one or more PSDUs.

Generating a particular HARQ coding unit information subfield among the respective HARQ coding unit information subfields comprises: determining whether the corresponding HARQ coding unit includes an initial transmission of the corresponding one or more PSDUs or a HARQ retransmission of the corresponding one or more PSDUs, in response to determining that the corresponding HARQ coding unit includes a HARQ retransmission of the corresponding one or more PSDUs, generating the particular HARQ coding specific subfield to include one or more retransmission specific subfields to indicate one or more parameters that are specific to the retransmission of the corresponding one or more PSDUs, and in response to determining that the corresponding HARQ coding unit is an initial transmission of the HARQ coding retransmission, generating the particular HARQ coding unit information subfield to exclude the one or more retransmission specific subfields.

Generating the PHY preamble further comprises: generating a regular signal field to be transmitted in the PHY preamble prior to transmission of the HARQ signal field in the PHY preamble, and in response to determining that the PHY data unit is to be transmitted according to the HARQ process, generating the regular signal field to include in an indicator to indicate that the PHY preamble includes the HARQ signal field following the regular signal field.

The PHY data unit is a multi-user (MU) PHY data unit to be transmitted to a plurality of other communication devices.

Generating the PHY preamble further includes generating an additional signal field that includes allocation information that allocates multiple frequency resource units (RUs) among the multiple other communication devices.

Generating the HARQ signal field comprises generating a respective HARQ user information subfield for one or more respective other communication devices, wherein each HARQ user information subfield includes a HARQ coding unit information subfield for each of one or more HARQ coding units for the respective other communication device, wherein each HARQ coding unit information subfield includes indications of respective one or respective PSDU.

The second signal field is generated to be transmitted within a first frequency subchannel.

The second signal field includes HARQ information only for PSDUs to be transmitted in one or more RUs that overlap with the first frequency subchannel.

Generating the PHY preamble further comprises generating one or more other HARQ signal fields corresponding to one or more respective second frequency subchannels, wherein each of the one or more other second signal fields are generated to include HARQ information only for HARQ coding units to be transmitted within one or more respective RUs that overlap with the respective second frequency subchannel.

In another embodiment, a wireless communication device comprises a network interface device associated with a first communication device, wherein the network interface device is implemented on one or more integrated circuit (IC) devices, and wherein the one or more IC devices are configured to: determine that the PHY data unit is to be transmitted according to a hybrid automatic repeat request (HARQ) process; generate a PHY data portion of the PHY data unit, comprising: generating one or more PHY protocol service data units (PSDUs), and in response to determining that the PHY data unit is to be transmitted according to the HARQ process, generating one or more HARQ coding units of a common length, each of the one or more HARQ coding units generated to include a respective set of one or more PSDUs among the one or more PSDUs, and individually encoding HARQ coding units among the one or more HARQ coding units. The one or more IC devices are further configured to generate a PHY preamble of the PHY data unit, including generating a HARQ signal field with HARQ information regarding the PHY data unit, wherein generating the HARQ signal field includes i) generating a common information subfield to indicate one or more parameters that commonly apply to each of at least some of the one or more HARQ coding units and ii) generating a respective HARQ coding unit information subfield for each of the one or more HARQ coding units to indicate one or more parameters that apply to only the corresponding HARQ coding unit among the one or more HARQ coding units.

In other embodiments, the wireless communication device also comprises one of, or any suitable combination of two or more of, the following features.

The one or more IC devices are configured to generate the common information subfield to include a duration indication to indicate the common length of the one or more HARQ coding units.

The one or more IC devices are configured to generate the common information subfield to include padding information that indicates a number of padding bits that were added to each of the one or more HARQ coding units.

The one or more IC devices are configured to generate the common information subfield to include an indicator of whether an extra OFDM symbol segment was included for each of the one or more HARQ coding unit in connection with low density parity check (LDPC) encoding of information in the HARQ coding unit.

The one or more IC devices are configured to generate the respective HARQ coding unit information subfields to include, in a particular HARQ coding unit information subfield, i) an index uniquely identifying the corresponding HARQ coding unit and ii) a transmission version indicator indicating a) that the corresponding HARQ coding unit is an initial transmission of the HARQ coding unit or b) a transmission number corresponding to a retransmission of the corresponding HARQ coding unit.

The one or more IC devices are configured to generate the one or more HARQ coding unit at least by generating at least one HARQ coding unit to include an initial transmission of one or more PSDUs and at least one HARQ coding unit to include a HARQ retransmission of one or more PSDUs.

The one or more IC devices are further configured to: determine whether the corresponding HARQ coding unit includes an initial transmission of the corresponding one or more PSDUs or a HARQ retransmission of the corresponding one or more PSDUs, in response to determining that the corresponding HARQ coding unit includes a HARQ retransmission of the corresponding one or more PSDUs, generate the particular HARQ coding specific subfield to indicate one or more retransmission specific subfields to indicate one or more parameters that are specific to the retransmission of the HARQ coding unit, and in response to determining that the corresponding HARQ coding unit is an initial transmission of the HARQ coding retransmission, generate the particular HARQ coding information subfield to exclude the one or more retransmission specific subfields.

The one or more IC devices are further configured to: generate a regular signal field to be transmitted in the PHY preamble prior to transmission of the HARQ signal field in the PHY preamble, and in response to determining that the PHY data unit is to be transmitted according to the HARQ process, generate the regular signal field to include in an indicator to indicate that the PHY preamble includes the HARQ signal field following the regular signal field.

The PHY data unit is a multi-user (MU) PHY data unit to be transmitted to a plurality of other communication devices.

The one or more IC devices are further configured to: generate the PHY preamble to include an additional signal field that includes allocation information that allocates multiple frequency resource units (RUs) among the multiple other communication devices, and generate a respective HARQ user information subfield for one or more respective other communication devices, wherein each HARQ user information subfield includes a HARQ coding unit information subfield for each of one or more HARQ coding units for the respective other communication device, wherein each HARQ coding unit information subfield includes indications of respective one or respective PSDU.

The HARQ signal field is generated to be transmitted within a first frequency subchannel.

The HARQ signal field includes HARQ information only for PSDUs to be transmitted in one or more RUs that overlap with the first frequency subchannel.

The one or more IC devices are further configured to generate the PHY preamble to further include one or more other HARQ signal fields corresponding to one or more respective second frequency subchannels, wherein each of the one or more other second signal fields are generated to include HARQ information only for HARQ coding units to be transmitted within one or more respective RUs that overlap with the respective second frequency subchannel.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions are stored in a computer readable memory such as a random access memory (RAM), a read only memory (ROM), a flash memory, etc. The software or firmware instructions include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for generating a physical layer (PHY) data unit for transmission in a wireless local area network (WLAN), the method comprising:
    determining, at a communication device, that the PHY data unit is to be transmitted according to a hybrid automatic repeat request (HARQ) process;
    generating, at the communication device, a PHY data portion of the PHY data unit, wherein generating the PHY data portion comprises:
    generating one or more PHY protocol service data units (PSDUs), and
    in response to determining that the PHY data unit is to be transmitted according to the HARQ process,
        generating one or more HARQ coding units of a common length, each of the one or more HARQ coding units generated to include a respective set of one or more PSDUs among the one or more PSDUs, and
        individually encoding HARQ coding units among the one or more HARQ coding units; and
    generating, at the communication device, a PHY preamble of the PHY data unit, including generating a HARQ signal field with HARQ information regarding the PHY data unit, wherein generating the HARQ signal field includes i) generating a common information subfield to indicate one or more parameters that commonly apply to each of at least some of the one or more HARQ coding units, the common information subfield including an indication of the common length of the one or more HARQ coding units and ii) generating a respective HARQ coding unit information subfield for each of the one or more HARQ coding units to indicate one or more parameters that apply to only the corresponding HARQ coding unit among the one or more HARQ coding units.

2. The method of claim 1, wherein generating the common information subfield field comprises generating the common information subfield to include a duration indication to indicate the common length of the one or more HARQ coding units.

3. The method of claim 1, wherein generating the common information subfield field comprises generating the common information subfield to include padding information that indicates a number of padding bits that were added to each of the one or more HARQ coding units.

4. The method of claim 1, wherein generating the common information subfield field comprises generating the common information subfield to include an indicator of whether an extra OFDM symbol segment was included for each of the one or more HARQ coding unit in connection with low density parity check (LDPC) encoding of information in the HARQ coding unit.

5. The method of claim 1, wherein generating the respective HARQ coding unit information subfields comprises generating a particular HARQ coding unit information subfield to include i) an index uniquely identifying the corresponding HARQ coding unit and ii) a transmission version indicator indicating a) that the corresponding HARQ coding unit is an initial transmission of the HARQ coding unit or b) a transmission number corresponding to a retransmission of the corresponding HARQ coding unit.

6. The method of claim 5, wherein:
    the second signal field is generated to be transmitted within a first frequency subchannel;
    the second signal field includes HARQ information only for PSDUs to be transmitted in one or more RUs that overlap with the first frequency subchannel;
    generating the PHY preamble further comprises generating one or more other HARQ signal fields corresponding to one or more respective second frequency subchannels, wherein each of the one or more other second signal fields are generated to include HARQ information only for HARQ coding units to be transmitted within one or more respective RUs that overlap with the respective second frequency subchannel.

7. The method of claim 1, wherein generating the one or more HARQ coding unit comprises generating at least one HARQ coding unit to include an initial transmission of one or more PSDUs and at least one HARQ coding unit to include a HARQ retransmission of one or more PSDUs.

8. The method of claim 7, wherein generating a particular HARQ coding unit information subfield among the respective HARQ coding unit information subfields comprises:
    determining whether the corresponding HARQ coding unit includes an initial transmission of the corresponding one or more PSDUs or a HARQ retransmission of the corresponding one or more PSDUs,
    in response to determining that the corresponding HARQ coding unit includes a HARQ retransmission of the corresponding one or more PSDUs, generating the particular HARQ coding specific subfield to include one or more retransmission specific subfields to indicate one or more parameters that are specific to the retransmission of the corresponding one or more PSDUs, and
    in response to determining that the corresponding HARQ coding unit is an initial transmission of the HARQ coding retransmission, generating the particular HARQ coding unit information subfield to exclude the one or more retransmission specific subfields.

9. The method of claim 1, wherein generating the PHY preamble further comprises:
generating a regular signal field to be transmitted in the PHY preamble prior to transmission of the HARQ signal field in the PHY preamble, and
in response to determining that the PHY data unit is to be transmitted according to the HARQ process, generating the regular signal field to include in an indicator to indicate that the PHY preamble includes the HARQ signal field following the regular signal field.

10. The method of claim 1, wherein:
the PHY data unit is a multi-user (MU) PHY data unit to be transmitted to a plurality of other communication devices;
generating the PHY preamble further includes generating an additional signal field that includes allocation information that allocates multiple frequency resource units (RUs) among the multiple other communication devices; and
generating the HARQ signal field comprises generating a respective HARQ user information subfield for one or more respective other communication devices, wherein each HARQ user information subfield includes a HARQ coding unit information subfield for each of one or more HARQ coding units for the respective other communication device, wherein each HARQ coding unit information subfield includes indications of respective one or respective PSDU.

11. A wireless communication device, comprising:
a network interface device associated with a first communication device, wherein the network interface device is implemented on one or more integrated circuit (IC) devices, and wherein the one or more IC devices are configured to:
determine that the PHY data unit is to be transmitted according to a hybrid automatic repeat request (HARQ) process;
generate a PHY data portion of the PHY data unit, comprising:
generating one or more PHY protocol service data units (PSDUs), and
in response to determining that the PHY data unit is to be transmitted according to the HARQ process, generating one or more HARQ coding units of a common length, each of the one or more HARQ coding units generated to include a respective set of one or more PSDUs among the one or more PSDUs, and
individually encoding HARQ coding units among the one or more HARQ coding units; and
wherein the one or more IC devices are further configured to generate a PHY preamble of the PHY data unit, including generating a HARQ signal field with HARQ information regarding the PHY data unit, wherein generating the HARQ signal field includes i) generating a common information subfield to indicate one or more parameters that commonly apply to each of at least some of the one or more HARQ coding units, the common information subfield including an indication of the common length of the one or more HARQ coding units and ii) generating a respective HARQ coding unit information subfield for each of the one or more HARQ coding units to indicate one or more parameters that apply to only the corresponding HARQ coding unit among the one or more HARQ coding units.

12. The wireless communication device of claim 11, wherein the one or more IC devices are configured to generate the common information subfield to include a duration indication to indicate the common length of the one or more HARQ coding units.

13. The wireless communication device of claim 11, wherein the one or more IC devices are configured to generate the common information subfield to include padding information that indicates a number of padding bits that were added to each of the one or more HARQ coding units.

14. The wireless communication device of claim 11, wherein the one or more IC devices are configured to generate the common information subfield to include an indicator of whether an extra OFDM symbol segment was included for each of the one or more HARQ coding unit in connection with low density parity check (LDPC) encoding of information in the HARQ coding unit.

15. The wireless communication device of claim 11, wherein the one or more IC devices are configured to generate the respective HARQ coding unit information subfields to include, in a particular HARQ coding unit information subfield, i) an index uniquely identifying the corresponding HARQ coding unit and ii) a transmission version indicator indicating a) that the corresponding HARQ coding unit is an initial transmission of the HARQ coding unit or b) a transmission number corresponding to a retransmission of the corresponding HARQ coding unit.

16. The wireless communication device of claim 11, wherein the one or more IC devices are configured to generate the one or more HARQ coding unit at least by generating at least one HARQ coding unit to include an initial transmission of one or more PSDUs and at least one HARQ coding unit to include a HARQ retransmission of one or more PSDUs.

17. The wireless communication device of claim 11, wherein the one or more IC devices are further configured to:
determine whether the corresponding HARQ coding unit includes an initial transmission of the corresponding one or more PSDUs or a HARQ retransmission of the corresponding one or more PSDUs,
in response to determining that the corresponding HARQ coding unit includes a HARQ retransmission of the corresponding one or more PSDUs, generate the particular HARQ coding specific subfield to indicate one or more retransmission specific subfields to indicate one or more parameters that are specific to the retransmission of the HARQ coding unit, and
in response to determining that the corresponding HARQ coding unit is an initial transmission of the HARQ coding retransmission, generate the particular HARQ coding information subfield to exclude the one or more retransmission specific subfields.

18. The wireless communication device of claim 11, wherein the one or more IC devices are further configured to:
generate a regular signal field to be transmitted in the PHY preamble prior to transmission of the HARQ signal field in the PHY preamble, and
in response to determining that the PHY data unit is to be transmitted according to the HARQ process, generate the regular signal field to include in an indicator to indicate that the PHY preamble includes the HARQ signal field following the regular signal field.

19. The wireless communication device of claim 11, wherein:
- the PHY data unit is a multi-user (MU) PHY data unit to be transmitted to a plurality of other communication devices;
- the one or more IC devices are further configured to:
  - generate the PHY preamble to include an additional signal field that includes allocation information that allocates multiple frequency resource units (RUs) among the multiple other communication devices; and
  - generate a respective HARQ user information subfield for one or more respective other communication devices, wherein each HARQ user information subfield includes a HARQ coding unit information subfield for each of one or more HARQ coding units for the respective other communication device, wherein each HARQ coding unit information subfield includes indications of respective one or respective PSDU.

20. The wireless communication device of claim 19, wherein:
- the HARQ signal field is generated to be transmitted within a first frequency subchannel;
- the HARQ signal field includes HARQ information only for PSDUs to be transmitted in one or more RUs that overlap with the first frequency subchannel; and
- the one or more IC devices are further configured to generate the PHY preamble to further include one or more other HARQ signal fields corresponding to one or more respective second frequency subchannels, wherein each of the one or more other second signal fields are generated to include HARQ information only for HARQ coding units to be transmitted within one or more respective RUs that overlap with the respective second frequency subchannel.

* * * * *